US012789845B2

(12) United States Patent
Philion et al.

(10) Patent No.: US 12,789,845 B2
(45) Date of Patent: Nov. 10, 2026

(54) VIRTUAL AGENT TRAJECTORY PREDICTION AND TRAFFIC MODELING FOR MACHINE SIMULATION SYSTEMS AND APPLICATIONS

(71) Applicant: NVIDIA Corporation, Santa Clara, CA (US)

(72) Inventors: Jonah Philion, Toronto (CA); Jeevan Devaranjan, Toronto (CA); Xue Bin Peng, Vancouver (CA); Sanja Fidler, Toronto (CA)

(73) Assignee: NVIDIA Corporation, Santa Clara, CA (US)

( * ) Notice: Subject to any disclaimer, the term of this patent is extended or adjusted under 35 U.S.C. 154(b) by 424 days.

(21) Appl. No.: 17/949,991

(22) Filed: Sep. 21, 2022

(65) Prior Publication Data

US 2024/0092390 A1 Mar. 21, 2024

(51) Int. Cl.
*B60W 60/00* (2020.01)
*B60W 30/095* (2012.01)
(Continued)

(52) U.S. Cl.
CPC .... *B60W 60/0015* (2020.02); *B60W 30/0953* (2013.01); *B60W 50/0097* (2013.01);
(Continued)

(58) Field of Classification Search
None
See application file for complete search history.

(56) References Cited

U.S. PATENT DOCUMENTS 10,740,954 B2 8/2020 Liu
10,776,985 B2 9/2020 Liu et al.
(Continued)

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

(Continued)

*Primary Examiner* — Hongye Liang
(74) *Attorney, Agent, or Firm* — Shook, Hardy & Bacon L.L.P.

(57) ABSTRACT

In various examples, systems and methods are presented for model-based trajectory simulation of agents in a simulated environment. Traffic simulators mimic reality so that autonomous or semi-autonomous vehicle design teams can validate driving models in environments that have diversity and complexity. In some embodiments, for a model-controlled agent of a simulation environment, a plurality of navigation probability distributions are generated, each of the plurality of navigation probability distributions defining a candidate trajectory for the agent to follow. A trajectory is selected for the agent based at least on at least one of the plurality of navigation probability distributions, and the agent is moved within the simulation environment based at least on the selected trajectory. In some embodiments, a search algorithm may be applied across multiple time-steps of a simulation, for example, to identify the occurrence of collision-free sequences of navigation probability distributions.

22 Claims, 22 Drawing Sheets

(51) Int. Cl.
*B60W 50/00* (2006.01)
*B60W 50/14* (2020.01)

(52) U.S. Cl.
CPC ........ *B60W 50/14* (2013.01); *B60W 60/0011* (2020.02); *B60W 2050/146* (2013.01)

(56) References Cited

U.S. PATENT DOCUMENTS

| | | | |
|---|---|---|---|
| 10,885,698 B2 | 1/2021 | Muthler et al. | |
| 10,891,783 B2 | 1/2021 | Panteleev | |
| 11,099,558 B2 | 8/2021 | Huang et al. | |
| 11,354,913 B1 * | 6/2022 | Houston | G06F 18/24 |
| 11,912,301 B1 * | 2/2024 | Hendy | B60W 60/00276 |
| 2019/0258251 A1 | 8/2019 | Ditty et al. | |
| 2022/0297728 A1 * | 9/2022 | Varadarajan | G06V 10/82 |
| 2025/0121852 A1 * | 4/2025 | Wang | G06N 7/01 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
Bansal, M., et al., "ChauffeurNet: Learning to Drive by Imitating the Best and Synthesizing the Worst", arXiv:1812.03079v1, pp. 1-20 (Dec. 7, 2018).
Brown, T. B., et al., "Language Models are Few-Shot Learners", arXiv:2005.14165v4, pp. 1-75 (Jul. 22, 2020).
Caesar, H., et al., "nuScenes: A multimodal dataset for autonomous driving", arXiv:1903.11027v3, pp. 1-16 (Nov. 22, 2019).
Casas, S., et al., "IntentNet: Learning to Predict Intention from Raw Sensor Data", 2nd Conference on Robot Learning (CoRL), arXiv:2101.07907v1, pp. 1-10 (Jan. 20, 2021).
Chai, Y., et al., "MultiPath: Multiple Probabilistic Anchor Trajectory Hypotheses for Behavior Prediction", 3rd Conference on Robot Learning (CoRL), arXiv:1910.05449v1, pp. 1-14 (Oct. 12, 2019).
Chang, M-F., et al., "Argoverse: 3D Tracking and Forecasting with Rich Maps", arXiv: 1911.02620v1, pp. 1-18 (Nov. 6, 2019).
Chen, Y., et al., "ScePT: Scene-consistent, Policy-based Trajectory Predictions for Planning", Proceedings of the IEEE/CVF Conference on Computer Vision and Pattern Recognition (CVPR), pp. 17103-17112 (2022).
Chollet, F., "Xception: Deep Learning with Depthwise Separable Convolutions", Proceedings of the IEEE Conference on Computer Vision and Pattern Recognition (CVPR), pp. 1251-1258 (2017).
Cui, H., et al., "Multimodal Trajectory Predictions for Autonomous Driving using Deep Convolutional Networks", arXiv:1809.10732v1, pp. 1-7 (Sep. 18, 2018).
Gao, J., et al., "VectorNet: Encoding HD Maps and Agent Dynamics from Vectorized Representation", arXiv:2005.04259v1, pp. 1-9 (May 8, 2020).
Gipps, P.G., "A Behavioural Car-Following Model for Computer Simulation", Transportation Research Part B: Methodological, vol. 15, Issue 2, pp. 105-111 (1981).
He, K., et al., "Deep Residual Learning for Image Recognition", arXiv:1512.03385v1, pp. 1-12 (Dec. 10, 2015).
Ho, J., and Ermon, S., "Generative Adversarial Imitation Learning", arXiv:1606.03476v1, pp. 1-14 (Jun. 10, 2016).
Hong, J., et al., "Rules of the Road: Predicting Driving Behavior with a Convolutional Model of Semantic Interactions", arXiv:1906.08945v1, pp. 1-9 (Jun. 21, 2019).
IEC 61508, "Functional Safety of Electrical/Electronic/Programmable Electronic Safety-related Systems", Retrieved from Internet URL: https://en.wikipedia.org/wiki/IEC_61508, accessed on Apr. 1, 2022, 7 pages.
ISO 26262, "Road vehicle—Functional safety", International standard for functional safety of electronic system, Retrieved from Internet URL: https://en.wikipedia.org/wiki/ISO_26262, accessed on Sep. 13, 2021, 8 pages.
Kesting, A., et al., "General Lane-Changing Model Mobil for Car-Following Models", Transportation Research Record: Journal of the Transportation Research Board, Transportation Research Board of the National Academies, vol. 1999, Issue 1, pp. 86-94 (2007).
Konev, S., et al., "MotionCNN: A Strong Baseline for Motion Prediction in Autonomous Driving", CVPR Workshop on Autonomous Driving, arXiv:2206.02163v1, pp. 1-6 (Jun. 5, 2022).
Lee, N., et al., "Desire: Distant Future Prediction in Dynamic Scenes with Interacting Agents", arXiv:1704.04394v1, pp. 1-10 (Apr. 14, 2017).
Lopez, P. A., et al., "Microscopic Traffic Simulation using SUMO", 21st International Conference on Intelligent Transportation Systems (ITSC), IEEE, pp. 2575-2582 (Nov. 4-7, 2018).
Manivasagam, S., et al., "LiDARsim: Realistic LiDAR Simulation by Leveraging the Real World", arXiv:2006.09348v1, pp. 1-11 (Jun. 16, 2020).
Marchetti, F., et al., "MANTRA: Memory Augmented Networks for Multiple Trajectory Prediction", arXiv:2006.03340v1, pp. 1-10 (Jun. 5, 2020).
Pal, A., et al., "Emergent Road Rules in Multi-Agent Driving Environments", arXiv: 2011.10753v1, pp. 1-12 (Nov. 21, 2020).
Philion, J., and Fidler, S., "Lift, Splat, Shoot: Encoding Images from Arbitrary Camera Rigs by Implicitly Unprojecting to 3D", In Proceedings of the European Conference on Computer Vision, arXiv:2008:05711v1, pp. 1-17 (Aug. 13, 2020).
Rempe, D., et al., "Generating Useful Accident-Prone Driving Scenarios via a Learned Traffic Prior", arXiv:2112.05077v1, pp. 1-21 (Dec. 9, 2021).
Ross, S., et al., "No-Regret Reductions for Imitation Learning and Structured Prediction", arXiv:1011.0686v2, pp. 1-9 (Nov. 3, 2010).
Sun, P., et al., "Scalability in Perception for Autonomous Driving: Waymo Open Dataset", arXiv: 1912.04838v5, pp. 1-9 (Dec. 18, 2019).
Suo, S., et al., "TrafficSim: Learning to Simulate Realistic Multi-Agent Behaviors", arXiv:2101.06557v1, pp. 1-18 (Jan. 17, 2021).
Tang, Y. C., and Salakhutdinov, R., "Multiple Futures Prediction", 33rd Conference on Neural Information Processing Systems (NeurIPS), arXiv:1911.00997v2, pp. 1-17 (Dec. 6, 2019).
Treiber, M., et al., "Congested Traffic States in Empirical Observations and Microscopic Simulations", Physical Review E, vol. 62, Issue 2, pp. 1-47 (Aug. 30, 2000).
Tung, P-M., et al., "CoverNet: Multimodal Behavior Prediction using Trajectory Sets", arXiv: 1911.10298v1, pp. 1-12 (Nov. 23, 2019).
Varadarajan, B., et al., "Multipath++: Efficient Information Fusion and Trajectory Aggregation for Behavior Prediction", arXiv:2111.14973v3, pp. 1-22 (Dec. 22, 2021).
Vinitsky, E., et al., "Lagrangian Control through Deep-RL: Applications to Bottleneck Decongestion", In 21st International Conference on Intelligent Transportation Systems (ITSC), pp. 759-765 (2018).
Wu, C., et al., "Emergent Behaviors in Mixed-Autonomy Traffic", 1st Conference on Robot Learning (CoRL), Proceedings of Machine Learning Research (PMLR), vol. 78, pp. 1-10 (Nov. 2017).
Wu, C., et al., "Flow: Architecture and Benchmarking for Reinforcement Learning in Traffic Control", Workshop on Machine Learning Open Source Software (NeurIPS), arXiv:1710.05465v1, pp. 1-16 (Oct. 16, 2017).
Zeng, W., et al., "End-to-end Interpretable Neural Motion Planner", arXiv:2101.06679v1, pp. 1-10 (Jan. 17, 2021).
Zhang, M. M., et al., "Adaptive Risk Minimization: A Meta-Learning Approach for Tackling Group Shift", ICLR Conference Blind Submission, pp. 1-16 (2021).
Zhou, M., et al., "SMARTS: Scalable Multi-Agent Reinforcement Learning Training School for Autonomous Driving", 4th Conference on Robot Learning (CoRL), pp. 1-22 (2020).
U.S. Appl. No. 62/644,385, filed Mar. 17, 2018, entitled "Geometric Shadow Filter for Denoising Ray-Traced Soft Shadows," 60 pages.

(56) References Cited

OTHER PUBLICATIONS

U.S. Appl. No. 62/644,386, filed Mar. 17, 2018, entitled "Energy Based Reflection Filter for Denoising Ray-Traced Glossy Reflections," 59 pages.
U.S. Appl. No. 62/644,601, filed Mar. 19, 2018, entitled "Distance Based Ambient Occlusion Filter for Denoising Ambient Occlusions," 58 pages.
U.S. Appl. No. 62/644,806, filed Mar. 19, 2018, entitled "Adaptive Occlusion Sampling of Rectangular Area Lights with Voxel Cone Tracing," 5 pages.

* cited by examiner

800

VIRTUAL AGENT TRAJECTORY PREDICTION AND TRAFFIC MODELING FOR MACHINE SIMULATION SYSTEMS AND APPLICATIONS

BACKGROUND

Traffic simulators attempt to mimic reality so that autonomous or semi-autonomous vehicle design teams can validate driving models in environments that have diversity and complexity. To accurately understand the risks of producing an autonomous or semi-autonomous vehicle for use on public roadways, designers must have confidence in the realism of the simulation used to test the driving models. Without realistic or accurate simulations, the vehicle under test may not be able to respond at a desirable or optimal level when deployed in real world scenarios. In real world driving, many (e.g., nearly every) other vehicles or actors (e.g., vulnerable road user (VRU), pedestrian, cyclist, etc.) may be controlled by a human. In simulation, some or all of the other simulated vehicles, which may be referred to as agents or actors, are typically controlled by a computer based on a policy that seeks to emulate realistic human driving or impose behaviors for a particular simulation scenario.

Motion prediction refers to one approach that can be used to predict the course of travel of a simulated vehicle or actor over a set period of time. Motion prediction can provide an estimate of the future motion of agents in a simulated scene by predicting a distribution over possible future trajectories of the agents, conditioned on previous observations. Another related technology is referred to as traffic modeling. Traffic modeling generally refers to the task of simulating a large number of agents in a scene for an extended period of time. A simulation that uses a traffic model that does not accurately produce agents that mimic the behaviors of human controlled vehicles can lead to less accurate estimates of the functionality or safety of a driving model for an autonomous or semi-autonomous vehicle.

Some approaches treat traffic modeling as an application of motion predication, or "behavior cloning," where traffic models are produced to include agents that exhibit more human-like driving behaviors. According to such approaches, and during simulation, a motion prediction model predicts future trajectories for each agent, and the agents follow these trajectories for a given number of simulation time-steps. However, this approach has been shown to result in virtual or simulated collisions between agents in a simulation at a rate substantially greater than experienced by vehicles with human drivers in the real-world. For example, as compared to recorded drives in real world traffic, when agents are controlled by a behavior cloning motion prediction model, they are up to five times more likely to collide with another agent within only an eight second simulation rollout. As such, even though prior approaches have attempted to mimic human-like behavior, these approaches have yet to reach a desirable or necessary correlation or similarity to human behavior.

SUMMARY

Embodiments of the present disclosure relate to virtual agent trajectory prediction for machine simulation systems and applications. Systems and methods are disclosed that provide simulated traffic environments which may be used for, among other things, training and validating autonomous or semi-autonomous driving systems in environments where other actors (e.g., vehicles, machines, VRUs, etc.) are also operating.

In contrast to existing traffic simulation technologies, the systems and methods presented in this disclosure may use a motion prediction model that is trained to generate contextually relevant navigation probability distributions at one or more (e.g., each) time-steps of a simulation. A trajectory for individual agents in the simulation may be determined from the navigation probability distributions, and the agents may iteratively travel along their respective selected trajectories over the duration of a simulation time-step. In embodiments, to compute candidate trajectories for the agent to follow, the motion prediction model receives inputs representing a localized map of a scene of a simulated traffic environment, a location of the other agents included in the simulated environment, and/or a target destination, and from those inputs computes one or more navigation probability distributions predicting possible future locations of the agent. Individual navigation probability distributions may represent a plausible trajectory for the agent to follow that may avoid collisions. In some embodiments, a search algorithm may be applied across time-steps of the simulation to identify the occurrence of collision free sequences of navigation probability distributions. Using the techniques described herein, simulation rollouts may be generated that more realistically simulate traffic conditions of machines and vehicles operated by human drivers and pilots, and with a lower rate of collision between agents than prior techniques.

BRIEF DESCRIPTION OF THE DRAWINGS

The present systems and methods for virtual agent trajectory prediction for machine simulation systems and applications are described in detail below with reference to the attached drawing figures, wherein.

DETAILED DESCRIPTION

Figure 1:
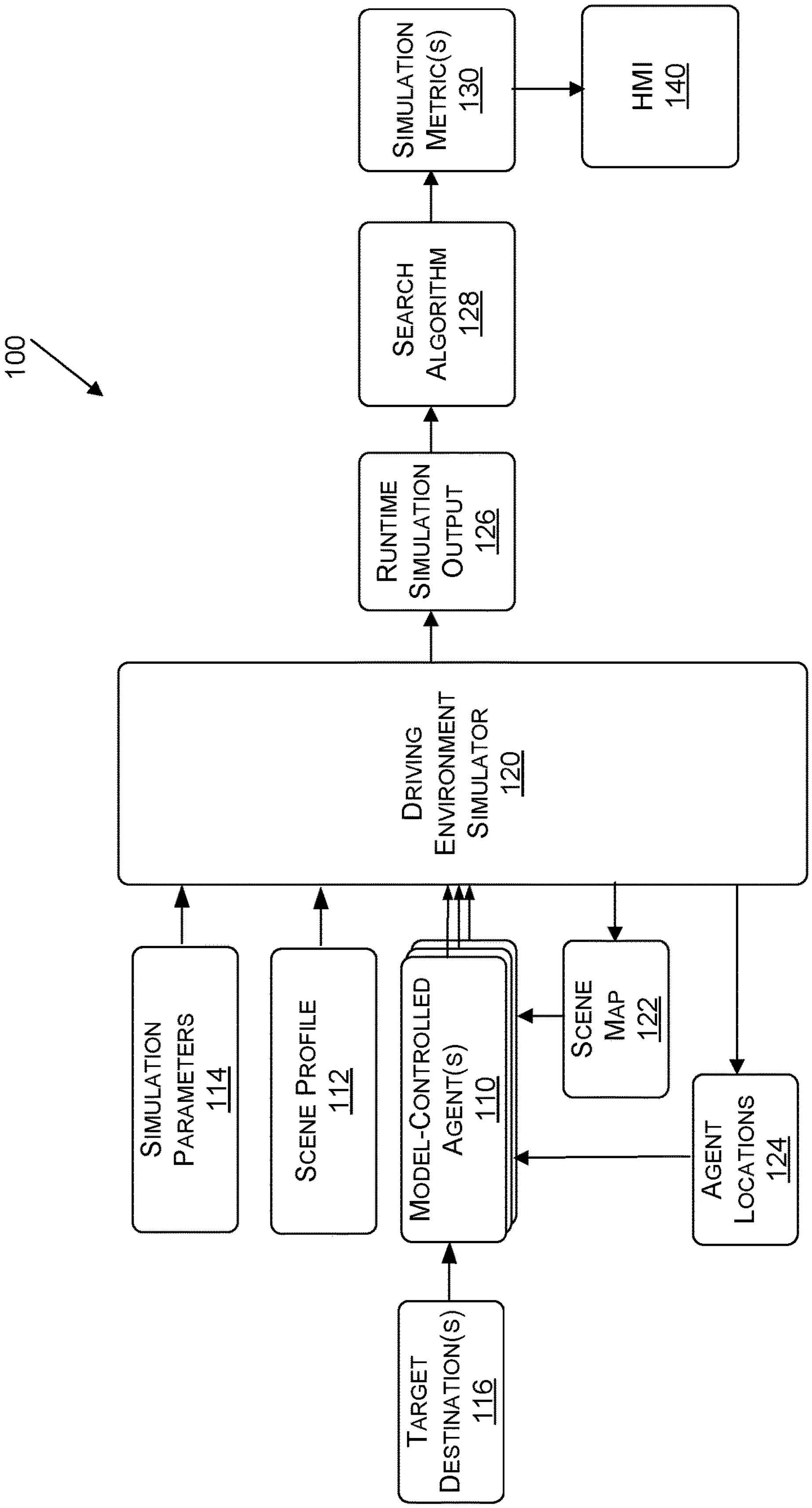
FIG. 1 is an illustration of an example flow diagram for a traffic simulation operating environment, in accordance with some embodiments of the present disclosure.

Systems and methods are disclosed related to virtual agent trajectory prediction for machine simulation systems and applications. Although the present disclosure may be described with respect to an example autonomous vehicle 1100 (alternatively referred to herein as "vehicle 1100" or "ego-machine 1100," an example of which is described with respect to FIGS. 11A-11D), this is not intended to be limiting. For example, the systems and methods described herein may be used for training, testing, and/or simulation of, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to vehicle traffic simulations, this is not intended to be limiting, and the systems and methods described herein may be used in augmented reality, virtual reality, mixed reality, robotics, security and surveillance, autonomous or semi-autonomous machine applications, and/or any other technology spaces where traffic simulations may be used.

More specifically, the systems and methods presented in this disclosure provide for simulating traffic environments which may be used for, among other things, training and validating autonomous or semi-autonomous driving systems on roadways where other vehicles, machines, or actors are also operating. A human driver typically starts to learn to drive first as a young passenger observing the driving habits of adults, such as their parents, then later as drivers, learning to react to and/or anticipate the actions of other drivers on the road while obeying traffic laws. To gain such experiences, an autonomous or semi-autonomous ego-machine would need to drive many of millions of miles in the real word, which could take years of driving and substantial capital investments to obtain. By driving within simulated traffic environments, an autonomous or semi-autonomous vehicle (e.g., simulated instances thereof, including software-in-the-loop (SIL), hardware-in-the-loop (HIL), person-in-the-loop (PIL), etc.) can be exposed to driving experiences in a fraction of the time as it would take as compared to a test vehicle driving in the real world. Moreover, simulations can be tailored to introduce the autonomous or semi-autonomous ego-machine to rare or dangerous situations that would be difficult to produce, encounter, or test against in the real world. In this way, machine learning models for autonomous or semi-autonomous vehicles or machines can be extensively tested across a diverse range of driving environments and conditions before being deployed in vehicles or machines on public roadways.

In contrast to existing traffic simulation technologies, the systems and methods presented in this disclosure may use a motion prediction model that generates contextually relevant navigation probability distributions at time-steps of a simulation. A path of travel for agents in the simulation (e.g., a trajectory) may be determined from the navigation probability distributions, and agents may iteratively travel along their respective determined path over the duration of the time-step. Further, a search algorithm may be applied across the multiple time-steps of the simulation to identify the occurrence of collision free sequences of navigation probability distributions. Using the techniques described herein, simulation rollouts may be generated with a lower rate of collision between agents than prior techniques—meeting or improving upon the collision rate of human drivers—resulting in more realistic simulations of human controlled vehicle traffic.

With respect to the function of the motion prediction model, for individual agents of the simulation, a motion prediction model may be instantiated that computes a plausible trajectory for the agent to follow. As discussed in more detail below, inputs to the motion prediction model include at least one channel that comprises a localized map of a region of the simulated driving environment in which the agent may be located, one or more channels that comprise the location of other agents navigating through the same region of the driving environment, one or more channels representing a target destination that the agent may be assigned to navigate to, and/or other types of channels.

A simulation "rollout" may refer to the execution of a sequence of simulation time-steps. Individual time-steps may represent a planning iteration during which an agent travels in accordance with a trajectory computed using their respective motion prediction model. After execution of a time-step is completed, the simulation may perform a re-planning task where the motion prediction model computes a trajectory for their agent to follow during the next time-step. The motion prediction model may be trained to compute trajectories that avoid collisions between the agent and the other agents.

In embodiments, to compute the trajectory for the agent to follow, the motion prediction model receives inputs representing the localized map, the location of the other agents, and/or the target destination (e.g., via corresponding channels), and from those inputs computes one or more (e.g., a plurality of) navigation probability distributions predicting possible future locations of the agent. The navigation probability distributions may represent a plausible trajectory (based on the motion prediction model's training) for the agent to follow that may avoid collisions. In some embodiments the navigation probability distributions may comprise one or more Gaussian distributions, such as but not limited to distributions computed by a Gaussian Mixture Model. In such embodiments, the mean vectors for the Gaussian distribution(s) may be used to compute a plausible trajectory for an agent for the next time-step of the simulation. For example, given a trajectory x, where $x \in \mathbb{R}^{T \times 2}$, and parameters σ, where $\sigma \in \mathbb{R}$, $\{\mu_i \in \mathbb{R}^{T \times 2}, p_i \in \mathbb{R}\}_k$ such that $p_i \geq 0$, $\Sigma p_i = 1$, then the probability that the agent will proceed according to trajectory x under the GMM may be given as:

$$p(x) = \sum_{i=1}^{K} p_i \mathcal{N}(x; \mu_i, \sigma I)$$

where $\mathcal{N}(\cdot; \mu, \Sigma)$ is the probability density function (PDF) of the multivariate normal distribution. In other embodiments, other probability distributions may be used for the navigation probability distributions in place of the Gaussian distribution. The motion prediction model may output a mean vector and covariance for individual navigation probability distributions.

In embodiments, the motion prediction model may compute a predetermined number K of navigation probability distributions each representing a candidate trajectory for the agent to follow. The motion prediction model may generate K navigation probability distributions that cover the range of plausible motion for the agent to follow given the localized map, location of other agents, and/or target destination. For example, given a predetermined value of K=6, the motion prediction model may generate six navigation probability distributions representing probable plausible trajectories having diverse directions of motions spanning the range of plausible motion.

From those K navigation probability distributions, the motion prediction model selects one (or more) of the candidate trajectories as the basis for computing a trajectory for the agent to travel over the next time-step. In one or more embodiments, the determination of which of the K navigation probability distributions to select may be performed at random, while other embodiments may apply different heuristics, routines, or policies for selection. The simulation may then be executed at a specified simulation iteration frequency (e.g., such as 10 Hz or 0.1 simulation iterations per second) for the duration of the time-step (e.g., 1.5 seconds), moving the agent along the selected trajectory at each simulation iteration. Re-planning the trajectories for individual agents for the next time-step may be performed in the same manner with motion prediction model input channels updated based on the new positions of the agent and the other agents resulting from the prior time-step. The process repeats for the number of time-step periods allocated to provide a simulation rollout of a desired duration. For example, a simulation rollout having four time-step periods of 1.5 seconds each would produce a simulation rollout of six seconds.

As previously mentioned, the inputs used by a motion prediction model to compute the K navigation probability distributions may include at least one channel that comprises a localized map of a region of the simulated driving environment in which the agent may be located, one or more channels that comprise the location of other agents navigating through the same region of the driving environment, and/or one or more channels representing a target destination that the agent may be assigned to navigate to. In at least one embodiment, a pre-processing operation may be executed that transforms scene context into a local coordinate frame referenced to the position of the agent. For example, in some embodiments, the position of an agent may be defined as the location of the center of the agent's bounding shape, and the direction of the agent's heading, based on the agent's initial position at the start of a time-step. The input channels are then rasterized based on the local coordinate frame for that time-step, projected into a two-dimensional (2D) top-down view. For example, with respect to the localized map, demarcations for driving lanes (e.g., lane centers and/or dividers), sidewalks, and similar road structures, are rasterized for input into the motion prediction model. Regarding the location of other agents in the simulation, the position of another agent may be defined based on the locations of the corners of a bounding shape corresponding to that other agent, and rasterized with respect to the local coordinate frame. In some embodiments, the corners of the bounding shape (e.g., where the bounding shape is a box, square, or rectangle) may be represented as unconnected points. Rasterizing of the input channels has the benefit that such representations can be readily rendered using fully parallelized operations on a graphical processing unit (GPU) or other parallel processing circuitry. Representing other agents by the corners of their bounding shape simplifies rendering these inputs, reducing computational complexity. Moreover, in some embodiments, the relative locations of the other agents with respect to the local coordinate frame are stacked as different input channels into tensor representations, which also reduces rendering time and processing time. As an example, input channels to the motion prediction model may be structure as a tensor (e.g., a 15×128×128 tensor).

As mentioned, another input channel into the motion prediction model may be a target destination (e.g., an (x, y) coordinate location with respect to the local coordinate frame) to condition the motion prediction model to compute plausible trajectories for the agent for the next time-step of the simulation to reach the target. As such, this input channel provides the simulation operators with at least some control over the traffic simulation as an agent can be directed to exhibit a given behavior. For example, an agent with an initial position in a far right-hand lane of a multi-lane highway may be directed (via a target destination input) to cut across lanes of traffic to make a left-hand turn at an intersection. In this way, the traffic simulation may be used to produce a simulation of a relatively rare and/or dangerous traffic scenario. In some embodiments, multiple possible target destination choices may be input, and the motion prediction model may generate navigation probability distributions for each. Further, an output from the simulation may include a destination conditioning metric (e.g., an average distance error, a final distance error, a miss rate) indicating how well the motion prediction model was able to navigate an agent to the target destination. Such a metric may be used to evaluate how well the traffic simulation created the desired scenario.

The motion prediction model may be implemented using a machine learning model. In some embodiments, the motion prediction model comprises a neural network such as, but not limited to, a convolutional neural network. A ResNet-18 convolutional neural network is an example of one such neural network that may be used to implement the motion prediction model. The neural network may be trained to predict human driving decisions and patterns using training datasets that comprise, or are derived from, recorded video of live traffic scenarios captured from a vehicle. The Waymo Open dataset and nuScenes dataset are two examples of high-resolution datasets that capture vehicle traffic on public roads that may be used as training datasets for the motion prediction model. When such datasets are used for training, the images of the datasets may be processed and rasterized to a local coordinate frame of the vehicle capturing the data, and projected into a 2D top-down view, as described herein. In some embodiments, additional training data may be synthesized from datasets comprising recordings of live traffic. In other embodiments, the motion prediction model may be implemented using a rules-based policy, or other probabilistic based prediction model.

Once the simulation rollout is complete, in embodiments, a collision search algorithm may be applied across the one or more (e.g., multiple) time-steps of the simulation rollout to identify and count how many collisions occurred on an agent-by-agent basis. Collisions may be counted based on instances where the bounding shapes of agents overlapped at any point during any time-step of the simulation rollout, and the output of the search algorithm may also identify the number of agents that encounter no collisions whatsoever during the simulation rollout. A simulation metric such as average agent collision rate, the number of collisions that occurred, the number or percentage of agents not involved in a collision, and/or other collision statistics may then be computed for the simulation rollout. In some embodiments, the simulation may generate an output providing one or more simulation metrics for display and/or display a graphical rendering of the simulation rollout. For example, the simulation may generate a display that illustrates the motion of agents within the scene across one or more time-steps of the simulation rollout.

Using a motion prediction model to compute K different navigation probability distributions at individual time-steps, on an agent-by-agent basis, and selecting a trajectory from the resulting K different mean vectors for individual navigation probability distributions, creates a discrete search space that can be searched by an algorithm to identify sequences of selected trajectories that did not involve collisions between agents, or that resulted in the least number of agent collisions, or for other events. In some embodiments, given the results of a simulation rollout, the search algorithm may search over sequences where the trajectory for the agent was selected from the K different mean vectors at each re-planning operation, and compute a collision rate or other collision statistic based on how many agents collided with another agent over the course of T time-steps of the simulation rollout. The motion prediction model of a simulator rollout not exceeding a collision rate threshold (or other design criteria) may then be used in a traffic simulator that mimics human driven vehicle traffic for testing, validating, and/or training machine learning ego-machine models. Moreover, a traffic simulation may be created using the sequence of paths selected for individual agents over the course of the rollout.

When the collision rate for a simulation rollout does not meet the collision rate threshold (e.g., too many collisions occurred between agents), this result potentially indicates that the training data used to train the motion prediction model may include images of collisions between vehicles, or near-miss occurrences. In that case, the training data may be reviewed and data samples comprising collisions and near-miss events culled from the dataset, and the machine learning model retrained.

In some embodiments, multiple simulation rollouts may be executed in parallel to speed up the process of testing motion prediction models for use in traffic simulations. As a non-limiting example, in one implementation, 64 different simulation rollouts may be executed in parallel using different versions of the motion prediction model and/or different traffic scenarios (e.g., different numbers of agents, different intersection geometries, agents with different target destinations). Where multiple parallel simulation rollouts are executed, if the depth of the search space for the search algorithm may be defined based on the number of time-steps included in the simulation rollouts, then the width of the search space correspondingly may expand based on the number of simulation rollouts performed. A simulation rollout using the motion prediction model producing the lowest agent collision rate may then be selected for use in a traffic simulator. If the search determines that multiple sequences of selected trajectories achieve the same collision rate, then the search algorithm may search the selected agent trajectories at individual time-steps and select the motion prediction model corresponding to the rollout that comprised the highest probability agent trajectories.

While a simulation rollout may comprise a plurality of agents whose motion is determined by identical motion prediction models, in other embodiments, the motion of the agents may be governed by a diverse set of motion prediction models. For example, a simulation rollout may use a set of motion prediction model-controlled agents where at least one agent represents, for example, an emergency vehicle, a vehicle with a student driver, a vehicle with an intoxicated driver, or other class of agent. In such implementations, the motion prediction models may function in the same manner as described above, but may be trained using a training dataset corresponding to that class of vehicle.

The motion prediction models, traffic simulation rollouts, and/or search algorithms may be executed at least in part on one or more graphics processing units (GPUs) (or other parallel processing circuitry, such as a parallel processing unit (PPU), a deep learning accelerator (DLA), a vector processing unit (VPU), a programmable vision accelerator (PVA), etc.) that may operate in conjunction with software executed on a central processing unit(s) (CPU(s)) coupled to memory. The GPUs are programmed to execute kernels to implement one or more of the features and functions of the motion prediction models, and in some embodiments, the motion prediction models for different agents of a simulation rollout may be executed in parallel on different GPUs. In some embodiments, some features and functions of the motion prediction models, traffic simulation rollouts, and/or search algorithms may be distributed and performed by a combination of processors and/or cloud computing resources.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example data flow diagram 100 for a traffic simulation operating environment, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In FIG. 1, the operating environment comprises a driving environment simulator 120 that may be used to execute a simulated traffic environment where one or more motion prediction model-controlled agents may simulate travel across one or more paths, providing realistic simulations of human controlled vehicle traffic. Input channels to the driving environment simulator 120 may include simulation parameters 114, a scene profile 112, and/or motion prediction model generated trajectories for one or more model-controlled agents 110. Simulation parameters 114 may include operating parameters relevant to structuring and performing the traffic simulation itself, such as but not limited to, the total duration of traffic time to simulate during a simulation rollout, the number of time-steps to include in the simulation rollout, the duration of traffic time to simulate during each time-step, a simulation iteration frequency (e.g., the number of simulation iterations per second) used during each time-step to simulate vehicle motion, and/or similar parameters. The scene profile 112 may define, for example, static characteristics of the simulated environment determined, using, for example and without limitation, a map that includes the dimensions and positions of roads, driving lanes, intersections, driveways, or other drivable surfaces (which may be referred to herein as "paths") and/or non-drivable surfaces such as, but not limited to, medians, sidewalks and/or curbs or other static objects.

As discussed herein, in some embodiments, individual agents included in the traffic simulation may be independently controlled within the simulated driving environment with respect to movement using a motion prediction model for that agent. As shown in FIG. 1, in some embodiments the driving environment simulator 120 may receive a respective trajectory input computed for the one or more simulated agents by a respective model-controlled agent 110. At individual time-steps of a simulation rollout, the model-controlled agent(s) 110 may compute a trajectory to follow during the next time-step. For example, after the driving environment simulator 120 completes execution of a time-step, model-controlled agent(s) 110 may compute a trajectory to follow during the next time-step. The selected trajectory may include a trajectory that is predicted to avoid collisions with other agents controlled by the other model-controlled agent(s) 110. In some embodiments, in order to produced realistic simulations of human controlled vehicle traffic, the model-controlled agent(s) 110 may be uninformed by the trajectory selection processes performed by each other—in the same way that a human vehicle driver cannot read the mind of other human vehicle drivers with which they share the road. Instead, the model-controlled agent(s) 110 may compute their trajectory based on inputs comprising observations of the environment around their agents, and the actions of other agents moving within the simulation environment, which are the factors typically considered by human drivers.

For example, in the embodiments shown for FIG. 1, the model-controlled agent(s) 110 may receive input channels comprising a scene map 122, agent locations 124, and/or target destinations 116. As further discussed within this disclosure, the scene map 122 may include at least one channel for each model-controlled agent 110 that comprises a localized map of a region of the simulated driving environment in which an agent may be located. A localized map for a model-controlled agent 110 may represent the simulation scene using the local coordinate frame of that model-controlled agent 110. The agent locations 124 comprise one or more channels indicating the location of the other agents navigating through the same region of the driving environment, and may also represent the location of the other agents with respect to the local coordinate frame. In some embodiments, the relative locations of the other agents with respect to the local coordinate frame are stacked as different input channels into tensor representations. For example, if a simulation environment includes ten independent model-controlled agents 110, then agent locations 124 received by a model-controlled agent 110 may comprise nine input channels, each corresponding to a respective location of another of the agents within the simulation environment. The target destinations 116 may comprise one or more channels representing a target destination that an agent may be assigned to navigate to over execution of the next execution of a time-step. The scene map 122, agent locations 124, and/or target destinations 116, may be refreshed by driving environment simulator 120 based on the resulting locations of each agent after executing of a time-step of the simulation rollout.

In some embodiments, a search algorithm 128 may be applied across a runtime simulation output 126 of the driving environment simulator 120 (which may, for example, be generated for one or more of the multiple time-steps of a simulation rollout) to identify the occurrence of collisions and/or collision free sequences. The search algorithm 128 may be applied across the multiple time-steps of the runtime simulation output 126 to identify and count how many collisions occurred on an agent-by-agent basis. One or more simulation metrics 130 may be computed from the search results of the search algorithm 128 such as average agent collision rate, the number of collisions that occurred, the number or percentage of agents not involved in a collision, and/or other collision statistics. In some embodiments, the simulation metric(s) 130 may be used to generate a display on a human-machine interface (HMI) 140 that illustrates the motion of the various model-controlled agents within the scene across one or more time-steps of the simulation rollout.

In some embodiments, driving environment simulator 120 may execute multiple simulation rollouts in parallel to speed up the process of testing one or more motion prediction models for use in traffic simulations. Where multiple parallel simulation rollouts are executed, the depth of the search space for the search algorithm 128 may be defined as a function of the number of time-steps included in the simulation rollouts, and the width of the search space correspondingly based on the number of simulation rollouts performed.

Figure 2:
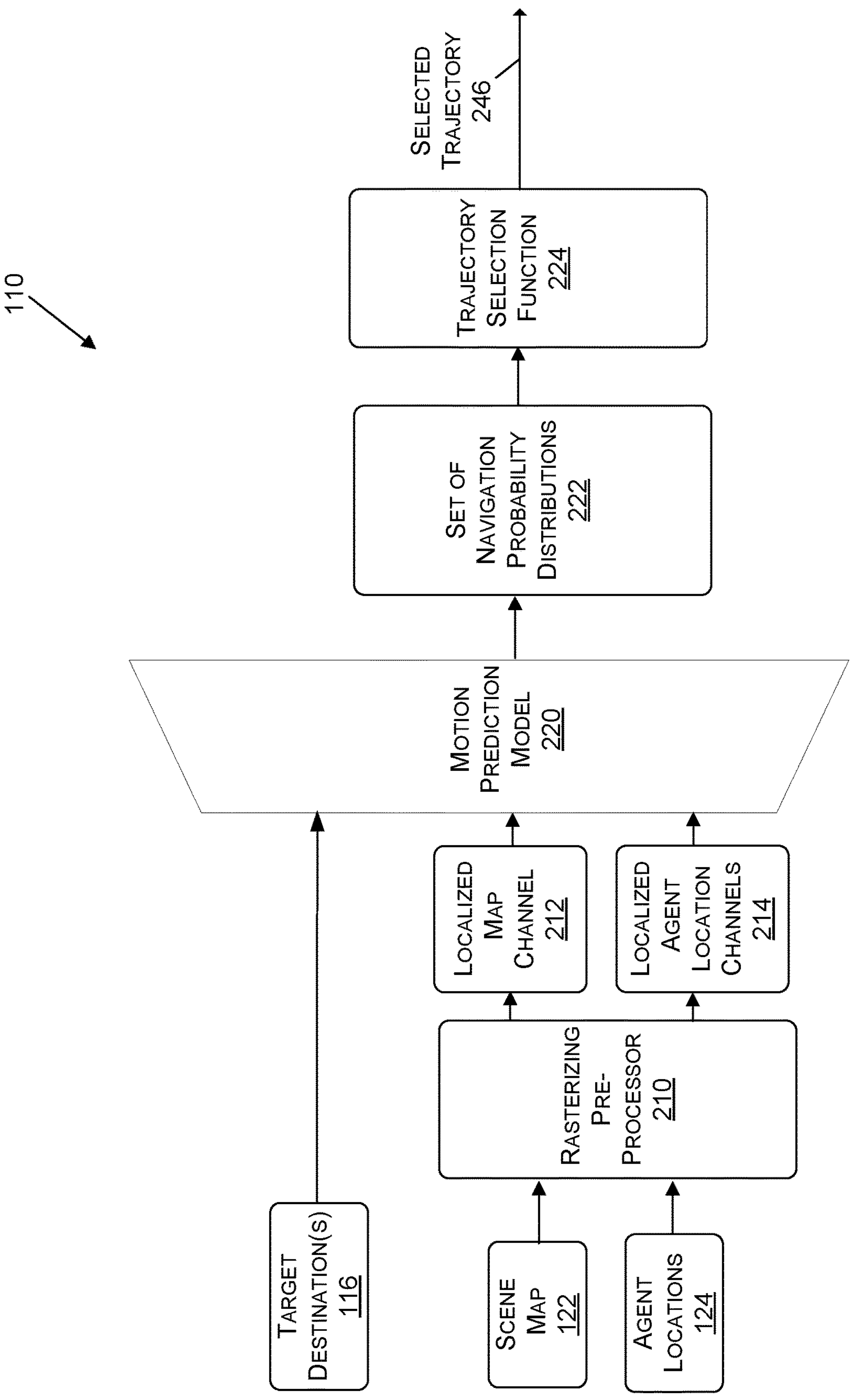
FIG. 2 is an illustration of an example model-controlled agent for traffic simulation operating environment, in accordance with some embodiments of the present disclosure.

Referring now to FIG. 2, FIG. 2 is a diagram illustrating an example model-controlled agent 110 according to an embodiment. As shown in FIG. 2, a model-controlled agent 110 may comprise a motion prediction model 220 that receives as input one or more input channels derived from scene map 122, agent locations 124, and/or a target destination(s) 116. In some embodiments, the model-controlled agent 110 may include a rasterizing pre-processor 210 that converts the scene map 122 and/or agent locations 124 respectively into one or more localized map channels 212 and one or more localized agent location channels 214. In some embodiments, the rasterizing pre-processor 210 comprises one or more algorithms that transforms scene context from the scene map 122 and/or agent locations 124 into a local coordinate frame referenced to the position of the model-controlled agent 110 within the simulation environment. The position of the agent may be computed based on a location of the center of the agent's bounding shape, and the direction of the agent's heading, from the agent's initial position at the start of a time-step. The input channels 122 and/or 124 may then be rasterized by the rasterizing pre-processor 210 based on the local coordinate frame for that time-step as projected into a 2D top-down view. The position of other agents in the simulation environment may be computed by the rasterizing preprocessor 210 using the locations of the corners (or other points) of a bounding shape corresponding to the position of the other agents, and rasterized with respect to the local coordinate frame. In some embodiments, the corners of the bounding shape of other agents may be represented in the one or more localized agent location channels 214 as unconnected points.

The motion prediction model 220 may be implemented using a machine learning model. In some embodiments, the motion prediction model comprises a neural network such as, but not limited to a convolutional neural network. A ResNet-18 convolutional neural network is an example of one such neural network that may be used to implement the motion prediction model 220. The motion prediction model 220 may be trained to predict human driving decisions and patterns using training datasets that comprise, or are derived from, recorded video of live traffic scenarios captured from a vehicle. The Waymo Open dataset and nuScenes dataset are two examples of high-resolution datasets that capture vehicle traffic on public roads that may be used as training datasets for the motion prediction model. In some embodiments, additional training data may be synthesized from datasets comprising recordings of live traffic. In other embodiments, the motion prediction model may be implemented using a rules-based policy, or other probabilistic based prediction model.

As shown in FIG. 2, motion prediction model 220 is trained to generate a contextually relevant set of navigation probability distributions 222, which in some embodiments may be computed at one or more (e.g., each) time-steps of the simulation rollout. The set of one or more navigation probability distributions 222 may comprises candidate trajectories for the agent to follow during the next time-step that are predicted by the motion prediction model 220 to avoid collisions between the agent and the other agents. That is, individual navigation probability distributions may represent a plausible candidate trajectory, based on the motion prediction model 220's training, for the agent to follow that is expected to avoid collisions. In some embodiments, the motion prediction model 220 may output a mean vector and covariance for each of the navigation probability distribution.

In embodiments, the motion prediction model 220 may compute a set of navigation probability distributions 222 that comprises a predetermined number K of navigation probability distributions each representing a candidate trajectory for the agent to follow, and that cover a range of plausible motion for the agent to follow given the localized map, location of other agents, and/or target destination. For example, given a predetermined value of K=6, the motion prediction model may generate six navigation probability distributions representing probable plausible trajectories having diverse directions of motions spanning the range of plausible motion. The set of navigation probability distributions 222 may be provided as input to a trajectory selection function 224, which may select one of the trajectories as the selected trajectory 246 for the agent to follow over the next time-step of the simulation rollout.

Figure 3:
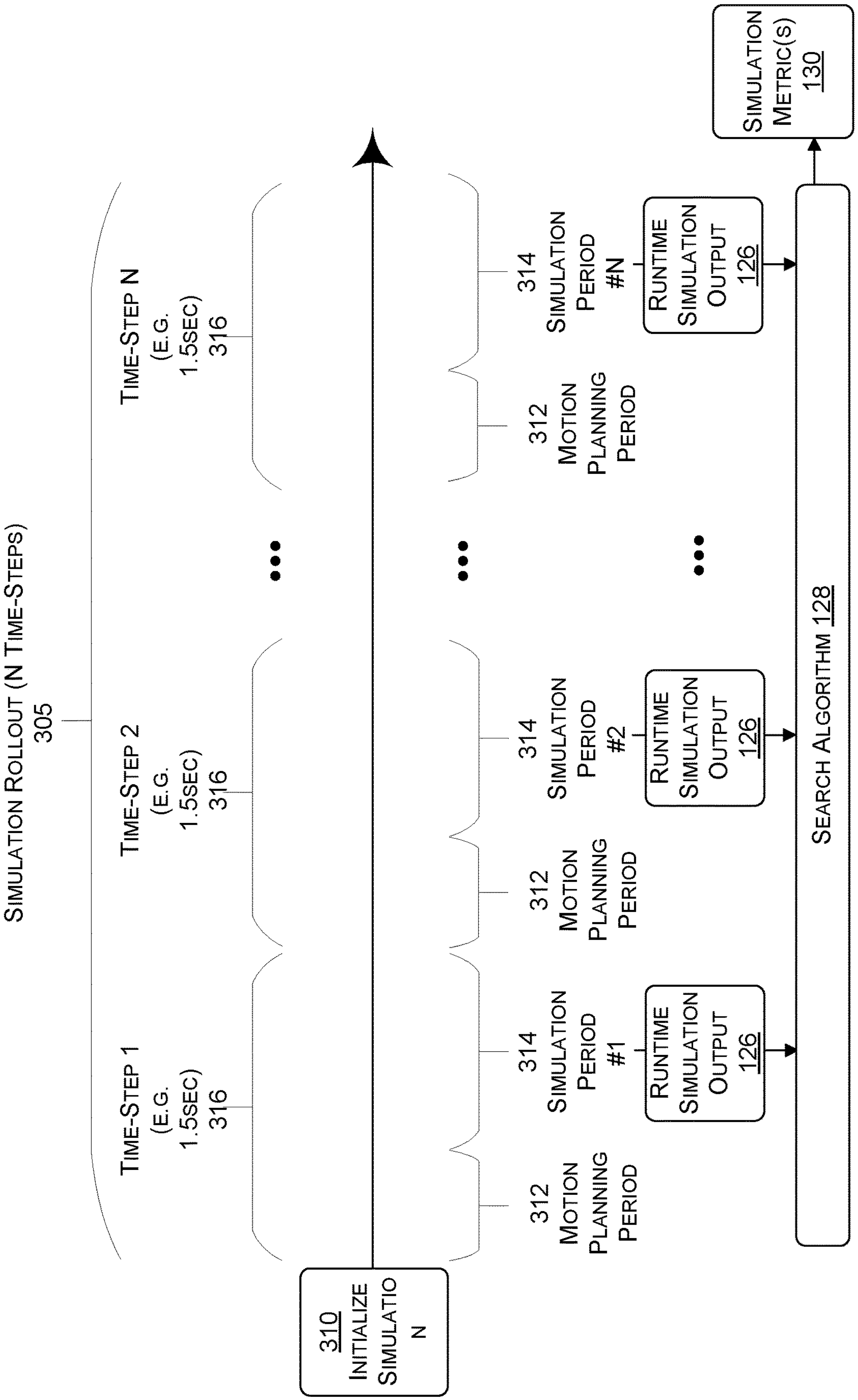
FIG. 3 is an illustration of an example simulation rollout for a traffic simulation operating environment, in accordance with some embodiments of the present disclosure.

Referring now to FIG. 3, FIG. 3 is a diagram illustrating an example simulation rollout 305 comprising N time-steps as shown at 316. As shown in FIG. 3, a simulation rollout 305 may begin with a simulation initialization 310 during which the simulation parameters 114 and scene profile 112 are loaded into the simulation environment, and each of the model-controlled agent(s) 110 are located within the simulation environment at their respective initial positions. In some embodiments, target destinations 116 for one or more of the model-controlled agents 110 may be specified at the simulation initialization 310. Individual time-steps 316 may comprise two segments that include a motion planning period 312 during which the driving environment simulator 120 executes a motion prediction iteration of the motion prediction model 220 and selects a trajectory for the agent to follow during the next simulation iteration, and a simulation period 314 during which the driving environment simulator 120 executes one or more (e.g., a plurality of) simulation iterations to move the agent within the simulation environment based on that selected trajectory. The simulation iterations may be executed at a specified simulation iteration frequency (e.g., such as 10 Hz or 0.1 simulation iterations per second) moving the agent along the selected trajectory within the simulation environment at each simulation iteration. In some embodiments, runtime simulation output 122 is produced for each simulation period 314, and may be provided to the search algorithm 128 to compute one or more simulation metrics 130 or as input for other operations. In some embodiments, the simulation metrics 130 may be displayed via HMI 140.

Figure 4:
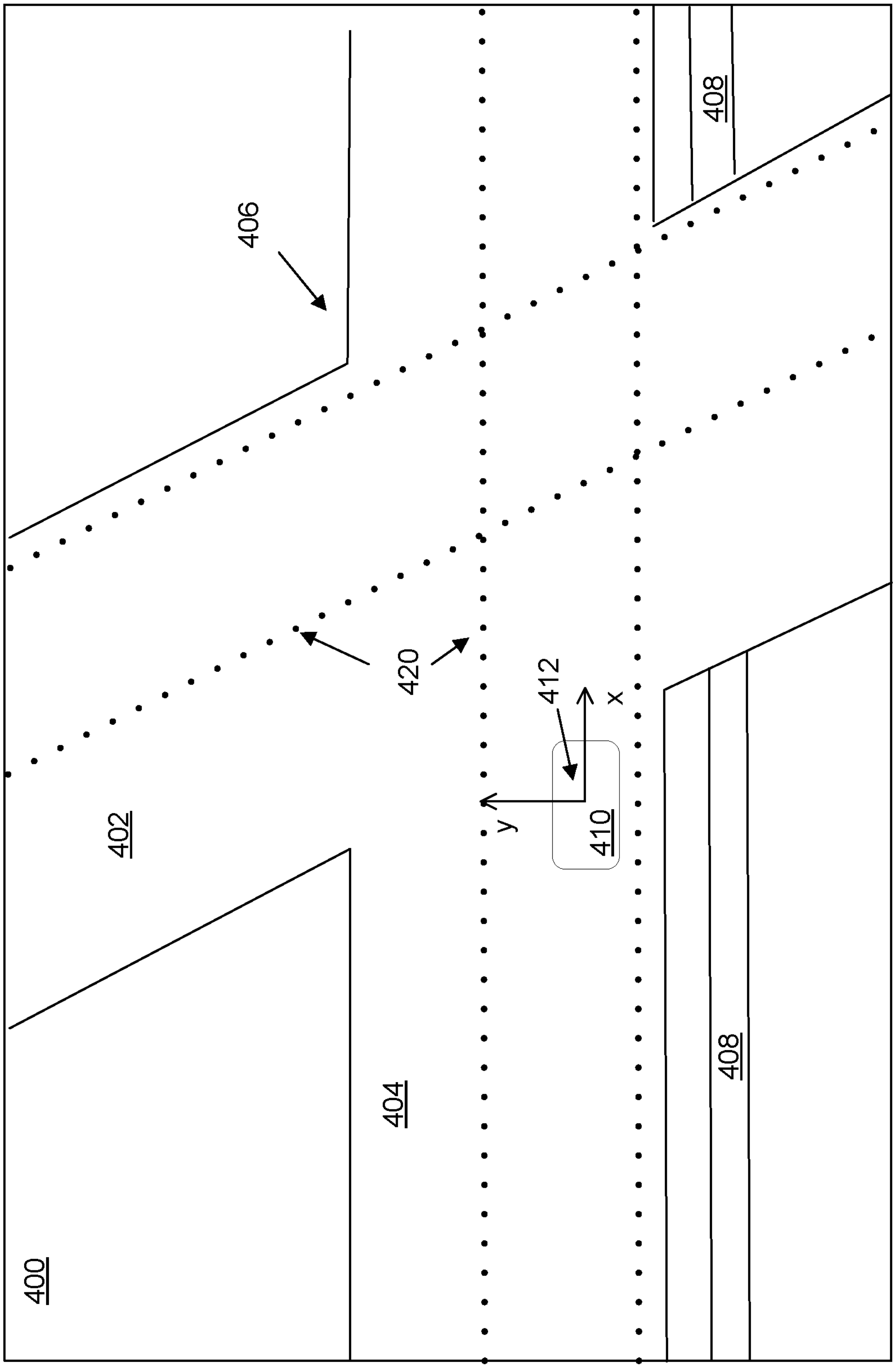
FIG. 4 is an illustration of an example rasterized map of scene for a simulated driving environment, in accordance with some embodiments of the present disclosure.

Referring now to FIG. 4, FIG. 4 illustrates at 400 a depiction of an example rasterized map of a simulated driving environment implemented by the driving environment simulator 120. In some embodiments, rasterized map 400 represents a 2D top-down rasterized map referenced to a local coordinate frame 412 of an agent 410 for the current time-step. In some embodiments, without limitation, the local coordinate frame 412 may be defined with respect to a center of a bounding shape for the agent 410. Rasterized map 400 for the simulated scene includes a first path 402 and a second path 404 that meet at an intersection 406. Moreover, one or more driving lanes 420 designated for travel by the agent 410 are represented. In this example, the scene map 400 includes at least one sidewalk 408 and may include other road structures and/or static characteristics of the simulated environment.

Figure 5:
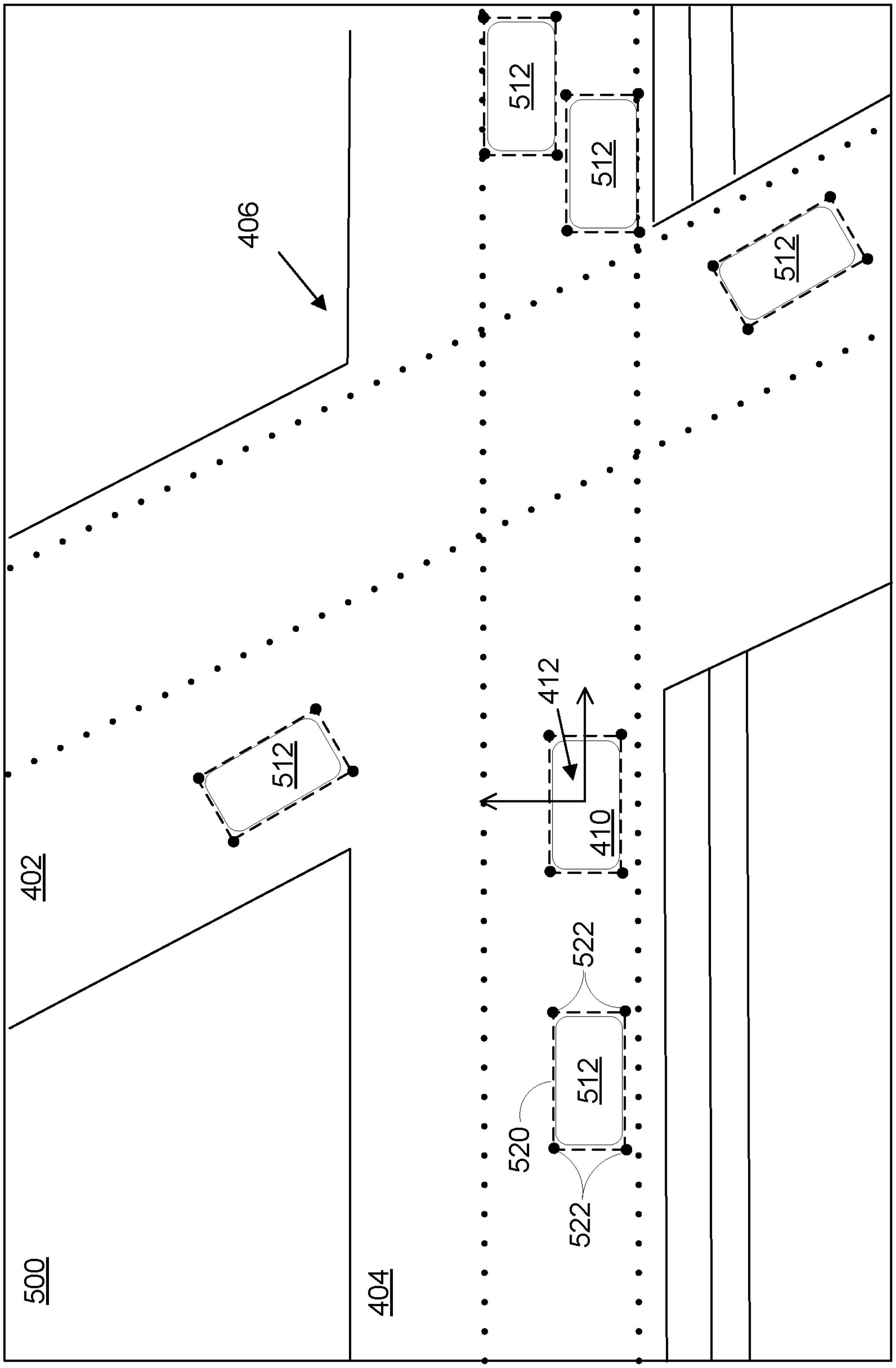
FIG. 5 is an illustration of an example rasterized map of agent locations for a simulated driving environment, in accordance with some embodiments of the present disclosure.

Referring now to FIG. 5, FIG. 5 illustrates agent locations 500, or more specifically the relative location of the agent 410 of FIG. 4 with respect to other independently controlled agents 512 within the simulated driving environment corresponding to the rasterized map 400. In some embodiments, the position of the other agents 512 included in the simulation environment are represented as unconnected points using the locations of the corners 522 of the bounding shape 520 corresponding to the position of the other agents 512, and may further be rasterized with respect to the local coordinate frame. The position of the other agents 512 for the current time-step may be referenced to the local coordinate frame 412 of model-controlled agent 410.

Figure 6:
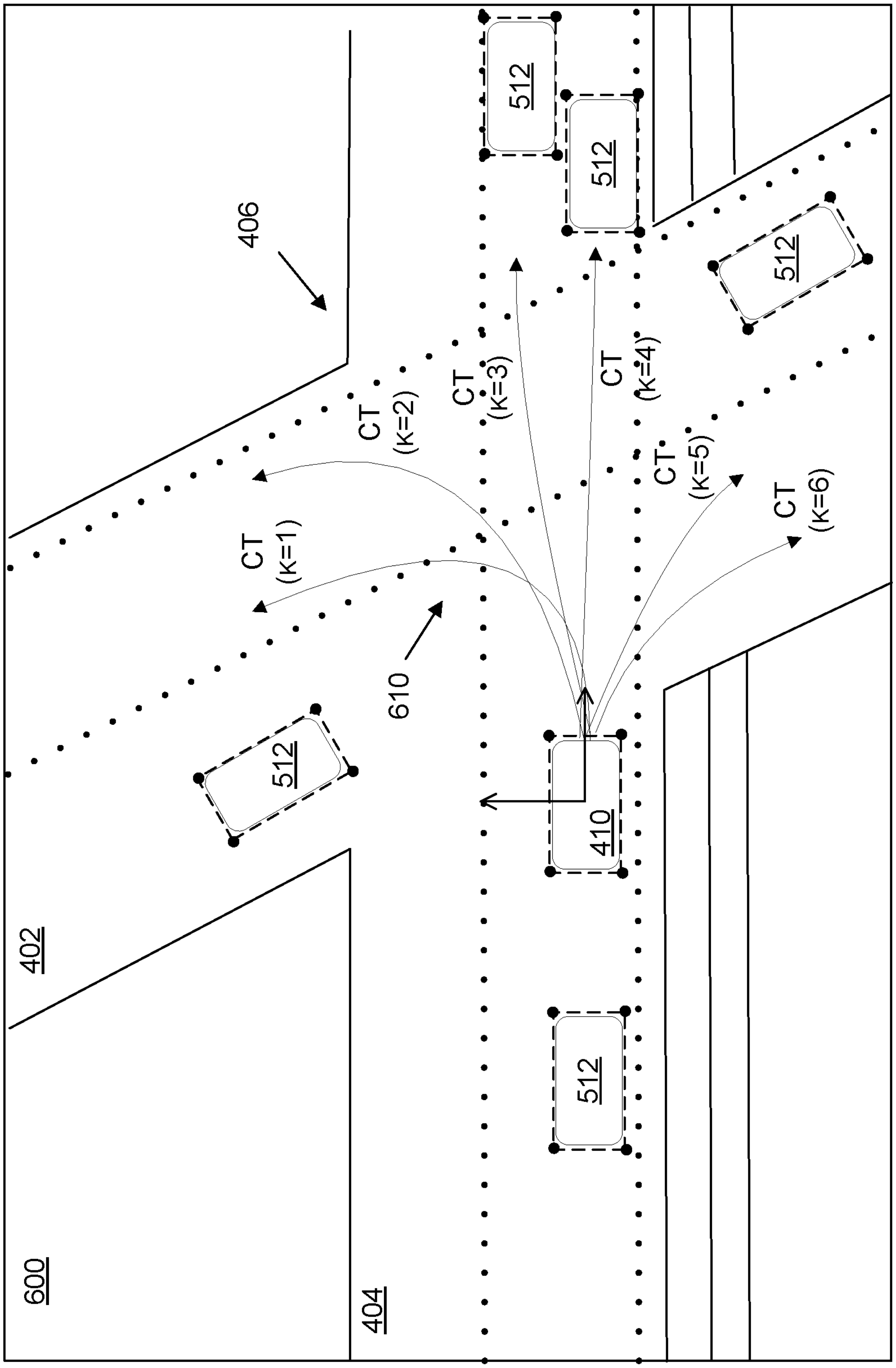
FIG. 6 is an illustration of an example set of navigation probability distributions computed by a motion prediction model for a simulated driving environment, in accordance with some embodiments of the present disclosure.

Referring now to FIG. 6, FIG. 6 illustrates a simulated driving environment scene 600 corresponding to a set of navigation probability distributions 610 computed by the motion prediction model 220. In this particular example, the set of navigation probability distributions 610 comprises candidate trajectories (CTs) which may be selected from by the trajectory selection function 224 to produce the selected trajectory 246. As shown in FIG. 6, two candidate trajectories (k=1 and k=2) may be trajectories corresponding to a left hand turn from path 404 onto path 402 at intersection 406, two candidate trajectories (k=5 and k=6) are trajectories corresponding to a right hand turn from path 404 onto path 402 at intersection 406, and two candidate trajectories (k=3 and k=4) are trajectories corresponding to passing through intersection 406 to stay on path 404. Each of the candidate trajectories for agent 410 represented by the set of navigation probability distributions 610 is a trajectory predicted by the motion prediction model 220 as likely to avoid a collision with the other agents 512 (which may be independently controlled by other motion prediction models). In other embodiments, a greater or few number of candidate trajectories 612 may be computed by the motion prediction model 220.

Figure 7:
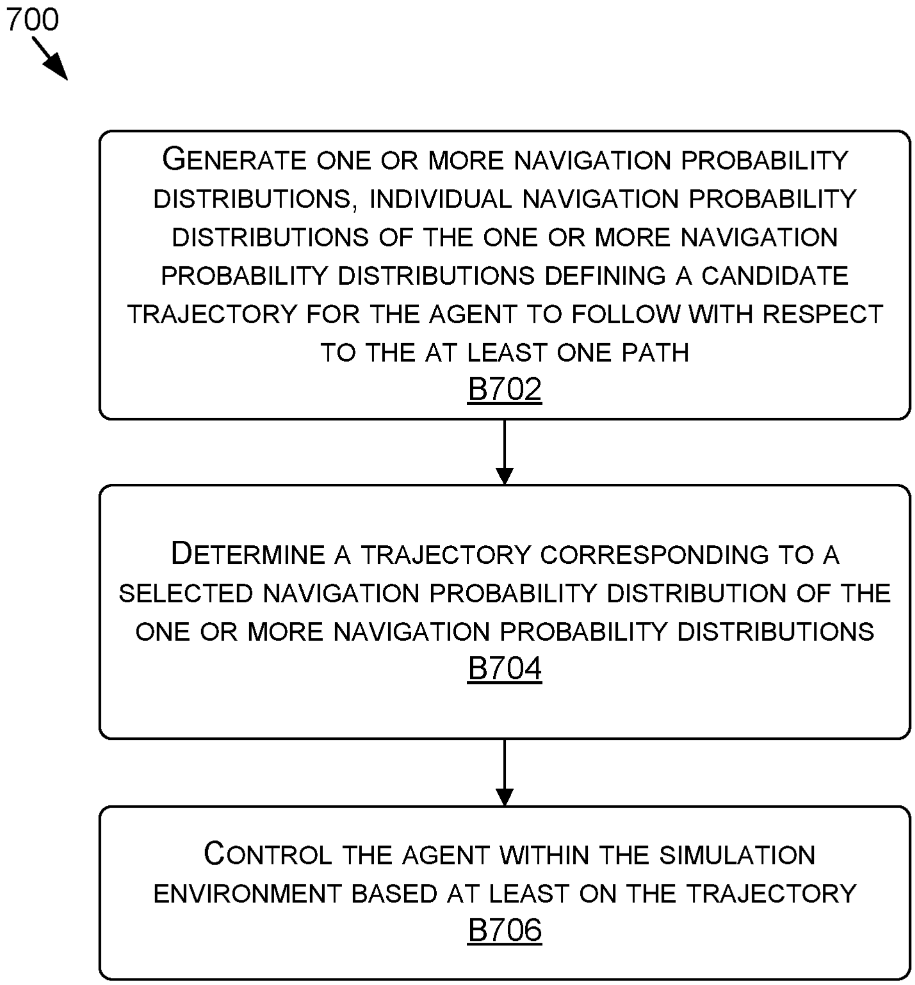
FIG. 7 is flow chart illustrating a method for a vehicle traffic simulation, in accordance with some embodiments of the present disclosure.

Now referring to FIG. 7, FIG. 7 is a flow diagram showing a method 700 for a vehicle traffic simulation, in accordance with some embodiments of the present disclosure. It should be understood that the features and elements described herein with respect to the method 700 of FIG. 7 may be used in conjunction with, in combination with, or substituted for elements of, any of the other embodiments discussed herein and vice versa. Further, it should be understood that the functions, structures, and other descriptions of elements for embodiments described in FIG. 7 may apply to like or similarly named or described elements across any of the figures and/or embodiments described herein and vice versa.

Each block of method 700, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 700 is described, by way of example, with respect to the system of FIG. 1. However, this method may additionally or alternatively be executed by any one system, or any combination of systems, including, but not limited to, those described herein.

The method 700 may be performed in conjunction with generating a simulation environment comprising a scene that includes at least one path for vehicle traffic and a plurality of model-controlled agents that travel on the at least one path. For at least a first agent of the plurality of model-controlled agents, the method 700 includes, at B702, generating one or more navigation probability distributions, individual navigation probability distributions of the one or more navigation probability distributions defining a candidate trajectory for the agent to follow with respect to the at least one path. In some embodiments, a motion prediction model may be instantiated for an agent that computes a plausible trajectory for the agent to follow in the simulation environment. The motion prediction model may comprise a machine learning model or a rules-based policy model. For example, the motion prediction model may comprise a machine learning model trained to predict human driving decisions based at least in part on a training dataset derived from recorded video of live traffic scenarios.

For example, with respect to FIG. 2, the motion prediction model 220 may receive inputs representing a localized map, the location of other agents, and/or a target destination and from those inputs compute the plurality of navigation probability distributions. Each of the navigation probability distributions represents a plausible trajectory (e.g., based on the motion prediction model's training) for the agent to follow that may avoid collisions. The navigation probability distributions may be computed at least in part from one or more inputs comprising a rasterized image of the scene. For example, the input to the motion prediction model 220 may include at least one channel that comprises a rasterized map of the at least one path, and the rasterized map may comprise a coordinate frame referenced to a position of the first agent. The input may include one or more channels that comprise a rasterized representation of a location of one or more other agents of the plurality of model-controlled agents, where the rasterized representation the based at least on the coordinate frame referenced to the position of the first agent. In some embodiments, the input may include one or more channels indicating a rasterized target destination for the first agent based at least on a coordinate frame referenced to a position of the first agent. The plurality of navigation probability distributions may comprise the set of navigation probability distributions 222 that represent candidate trajectories for the agent to follow during the next time-step that are predicted by the motion prediction model 220. Each of the navigation probability distributions may represent a plausible candidate trajectory, based on the motion prediction model 220's training, for the agent to follow that may is expected to avoid collisions. In some embodiments, the motion prediction model 220 may generate navigation probability distributions that represent probable plausible trajectories having diverse directions of motions spanning the range of plausible motion.

At B704, the method 700 includes determining a trajectory corresponding to a selected navigation probability distribution of the one or more navigation probability distributions. In some embodiments, the selection is based at least on a random selection of a first navigation probability distribution from the plurality of navigation probability distributions. From the plurality of navigation probability distributions, in some embodiments, a motion prediction model selects one of the candidate trajectories as the basis for computing the first trajectory, which defines the path for the agent to travel over the next time-step of a simulation rollout. For example, with respect to FIG. 2, the motion prediction model 220 may provide the plurality of navigation probability distributions as input to trajectory selection function 224, which responds by selecting a trajectory 245 for the first agent to follow.

At B706, the method 700 includes controlling the agent within the simulation environment based at least on the trajectory. For example, the method may include moving the first agent within the simulation environment. The method may include executing a simulation iteration during which the first agent is moved over the course of a plurality of simulation iterations executed at a specified simulation iteration frequency (e.g., such as 10 Hz or 0.1 simulation iterations per second) for the duration of the time-step. The process may repeat for the number of time-step periods allocated to provide a simulation rollout of a desired duration. For example, a simulation rollout having four time-step periods of 1.5 seconds each would produce a simulation rollout of six seconds. For example, with respect to FIG. 1, the driving environment simulator 120 may receive the selected trajectory for the first agent and literately advance the first agent based on the selected trajectory during the next simulation period. B702, B704 and B706 may then be repeated a number of times over the course of a simulation rollout (as illustrated in FIG. 3), with the first agent moving within the simulation environment based on the selected trajectory determined from that motion planning period. Moreover, the driving environment simulator 120 may receive the selected trajectories corresponding to a plurality of distinct model-controlled agents 110, which are each independently propagated during the simulation periods based on their respective selected trajectories. The driving environment simulator 120 may provide a realistic simulations of human controlled vehicle traffic because, in the same way that a human vehicle driver cannot read the mind of other human vehicle drivers with which they share the road, the model-controlled agent(s) 110 may select a trajectory uninformed of the trajectories selected by other agents that are moving within the simulation environment. Instead, the model-controlled agent(s) 110 may compute the trajectory for their agents based on inputs comprising observations of the environment around their agents, and the actions of other agents moving within the simulation environment, which are the factors typically considered by human drivers. While ideally collisions between model-controlled agent may be avoided during the simulation rollout, a search algorithm (such as search algorithm 128) may be applied to the runtime simulation output 126 to identify instance (e.g., selected trajectories) where collisions occurred, and one or more simulation metrics 130 computed, such as a collision statistic based on instances where agents collided with other agents over the course of the time-steps of the simulation rollout.

Figure 8:
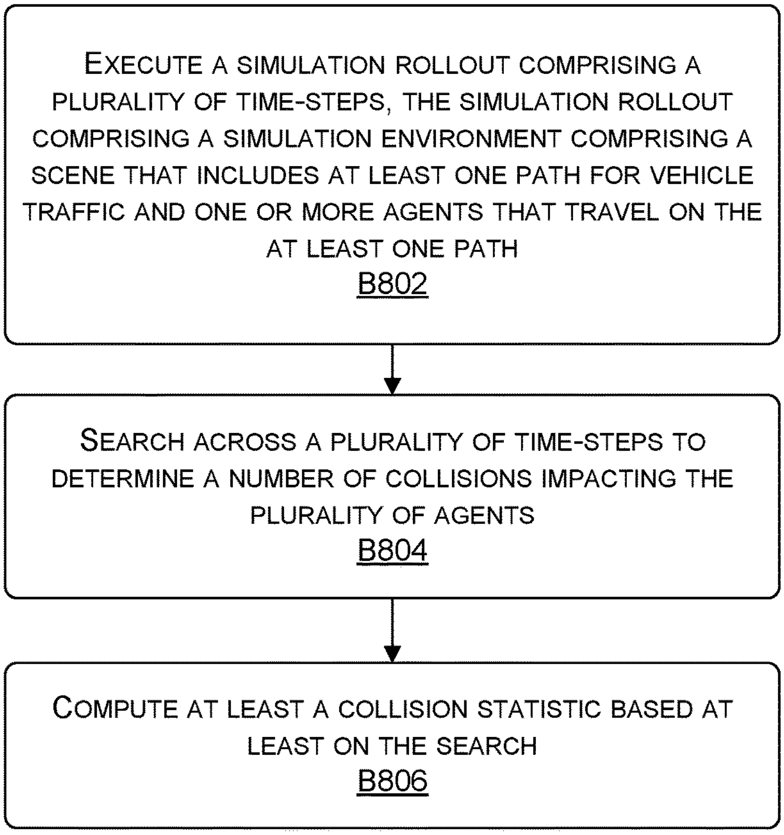
FIG. 8 is flow chart illustrating a method for a vehicle traffic simulation, in accordance with some embodiments of the present disclosure.

Now referring to FIG. 8, FIG. 8 is a flow diagram showing a method 800 for a vehicle traffic simulation, in accordance with some embodiments of the present disclosure. It should be understood that the features and elements described herein with respect to the method 800 of FIG. 8 may be used in conjunction with, in combination with, or substituted for elements of, any of the other embodiments discussed herein and vice versa. Further, it should be understood that the functions, structures, and other descriptions of elements for embodiments described in FIG. 8 may apply to like or similarly named or described elements across any of the figures and/or embodiments described herein and vice versa.

Each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 800 is described, by way of example, with respect to the system of FIG. 1. However, this method may additionally or alternatively be executed by any one system, or any combination of systems, including, but not limited to, those described herein.

The method 800, includes a B802 executing a simulation rollout comprising a plurality of time-steps, the simulation rollout comprising a simulation environment comprising a scene that includes at least one path for vehicle traffic and one or more agents that travel on the at least one path. In some embodiments, the simulation rollout may be implemented as described with respect to FIG. 3, FIG. 7, and/or as elsewhere described herein. At B804, the method 800 includes searching across the plurality of time-steps to determine a number of collisions impacting the plurality of agents. For example, a collision search algorithm may be applied across the multiple time-steps of the simulation to identify the occurrence of collision-free sequences of navigation probability distributions. In some embodiments, a search algorithm (such as search algorithm 128) may be applied to the runtime simulation output 126 from the driving environment simulator to identify instance (e.g., selected trajectories) where collisions occurred. Based on the search results, one or more simulation metrics 130 may be computed, such as a collision statistic regarding instances where agents collided with other agents over the course of the time-steps of the simulation rollout. The search algorithm 128 may search across the plurality of time-steps for at least one sequence of selected trajectories that did not involve a collision between the plurality of model-controlled agents over a duration of the simulation rollout. The search algorithm may search across the plurality of time-steps for a plurality of simulation rollouts to determine a number of collisions between the plurality of model-controlled agents for each of the plurality of simulation rollouts.

At B806, the method 800 includes computing at least one simulation metric (e.g., a collision statistic) based at least on the search. As discussed herein, using the results of a simulation rollout, the search algorithm 128 may search over sequences of simulation periods (such as simulation periods 314 shown in FIG. 3) where the trajectory for the agent was selected from the candidate trajectories at each motion planning period 312. The method may compute simulation metrics such as a collision rate or other collision statistic based on how many agents collided with another agent over the course of the time-steps of the simulation rollout, an average agent collision rate, a number of collisions that occurred, a number or percentage of agents not involved in a collision, and/or other collision statistics. In some embodiments, the simulation metric(s) may be used to generate a display on a human-machine interface (HMI) that illustrates the motion of the various model-controlled agents within the scene across one or more time-steps of the simulation rollout. The simulation metrics, in some embodiments, may be included on a display that illustrates the motion of agents within the scene across one or more time-steps of the simulation rollout.

Example Simulation System

In some embodiments, a traffic simulation operating environment, in accordance with some embodiments of the present disclosure, may be used to test one or more autonomous or semi-autonomous driving software stacks. For example, the simulation system 900—e.g., represented by simulation systems 900A, 900B, 900C, and 900D in FIGS. 9A-D, and described in more detail below—may generate a global simulation that simulates a virtual world or environment (e.g., a simulated environment), such as the embodiments of a traffic simulation operating environment described herein, that may include artificial intelligence (AI) vehicles or other objects (e.g., pedestrians, animals, etc.), hardware-in-the-loop (HIL) vehicles or other objects, software-in-the-loop (SIL) vehicles or other objects, and/or person-in-the-loop (PIL) vehicles or other objects. The global simulation may be maintained within an engine (e.g., a game engine), or other software-development environment, that may include a rendering engine (e.g., for 2D and/or 3D graphics), a physics engine (e.g., for collision detection, collision response, etc.), sound, scripting, animation, AI, networking, streaming, memory management, threading, localization support, scene graphs, cinematics, and/or other features. In some examples, as described herein, one or more vehicles or objects within the simulation system 900 (e.g., HIL objects, SIL objects, PIL objects, AI objects, etc.) may be maintained within their own instance of the engine. In such examples, a virtual sensor for each virtual object may include its own instance of the engine (e.g., an instance for a virtual camera, a second instance for a virtual LIDAR sensor, a third instance for another virtual LIDAR sensor, etc.). As such, an instance of the engine may be used for processing sensor data for each virtual sensor with respect to the virtual sensor's perception of the global simulation. As such, for a virtual camera, the instance may be used for processing image data with respect to the virtual camera's field of view in the simulated environment. As another example, for an virtual IMU sensor, the instance may be used for processing IMU data (e.g., representative of orientation) for the object in the simulated environment.

AI controlled agents, such as model-controlled agents 110, or other objects within the simulation environment may include pedestrians, animals, third-party vehicles, vehicles, and/or other object types. The agents executed within the simulated environment may be controlled using artificial intelligence (e.g., machine learning such as neural networks, rules-based control, a combination thereof, etc.) in a way that simulates, or emulates, how corresponding real-world objects would behave. In some examples, the rules, or actions, for agents may be learned from one or more HIL objects, SIL objects, and/or PIL objects. In an example where an agent in the simulated environment corresponds to a pedestrian, the bot may be trained to act like a pedestrian in any of a number of different situations or environments (e.g., running, walking, jogging, not paying attention, on the phone, raining, snowing, in a city, in a suburban area, in a rural community, etc.). As such, when the simulated environment is used for testing vehicle performance (e.g., for HIL or SIL embodiments), the bot (e.g., the pedestrian) may behave as a real-world pedestrian would (e.g., by jaywalking in rainy or dark conditions, failing to heed stop signs or traffic lights, etc.), in order to more accurately simulate a real-world environment. This method may be used for any agent in the simulated environment, such as vehicles, bicyclists, or motorcycles, whose agents may also be trained to behave as real-world objects would (e.g., weaving in and out of traffic, swerving, changing lanes with no signal or suddenly, braking unexpectedly, etc.).

The AI objects that may be distant from the vehicle of interest (e.g., the ego-vehicle in the simulated environment) may be represented in a simplified form—such as a radial distance function, or list of points at known positions in a plane, with associated instantaneous motion vectors. As such, the AI objects may be modeled similarly to how AI agents may be modeled in videogame engines.

HIL vehicles or objects may use vehicle hardware 901 that is used in the physical vehicles or objects to at least assist in some of the control of the HIL vehicles or objects in the simulated environment. For example, a vehicle (e.g., a model-controlled agent 110) controlled in a HIL environment may use one or more system-on-chips (SoCs 905), central processing units (CPUs), graphics processing units (GPUs), etc., in a data flow loop for controlling the vehicle in the simulated environment. In some examples, the vehicle hardware 901 hardware from the vehicles may be an NVIDIA DRIVE AGX Pegasus™ compute platform and/or an NVIDIA DRIVE PX Xavier™ compute platform. For example, the vehicle hardware (e.g., vehicle hardware 901) may include some or all of the components and/or functionality described in U.S. Non-Provisional application Ser. No. 16/186,473, filed on Nov. 9, 2018, which is hereby incorporated by reference in its entirety. In such examples, at least some of the control decisions may be generated using the hardware that is configured for installation within a real-world autonomous vehicle to execute at least a portion of a software stack 903 (e.g., an autonomous driving software stack).

SIL vehicles or objects may use software to simulate or emulate the hardware from the HIL vehicles or objects. For example, instead of using the actual hardware that may be configured for use in physical vehicles, software, hardware, or a combination thereof may be used to simulate or emulate the actual hardware (e.g., simulate the SoC(s) 905).

PIL vehicles or objects may use one or more hardware components that allow a remote operator (e.g., a human, a robot, etc.) to control the PIL vehicle or object within the simulated environment. For example, a person or robot may control the PIL vehicle using a remote control system (e.g., including one or more pedals, a steering wheel, a VR system, etc.), such as the remote control system described in U.S. Non-Provisional application Ser. No. 16/366,506, filed on Mar. 27, 2019, and hereby incorporated by reference in its entirety. In some examples, the remote operator may control autonomous driving level 0, 1, or 2 (e.g., according to the Society of Automotive Engineers document J3016) virtual vehicles using a VR headset and a CPU(s) (e.g., an X86 processor), a GPU(s), or a combination thereof. In other examples, the remote operator may control advanced AI-assisted level 2, 3, or 4 vehicles modeled using one or more advanced SoC platforms. In some examples, the PIL vehicles or objects may be recorded and/or tracked, and the recordings and/or tracking data may be used to train or otherwise at least partially contribute to the control of AI objects, such as those described herein.

Figure 9A:
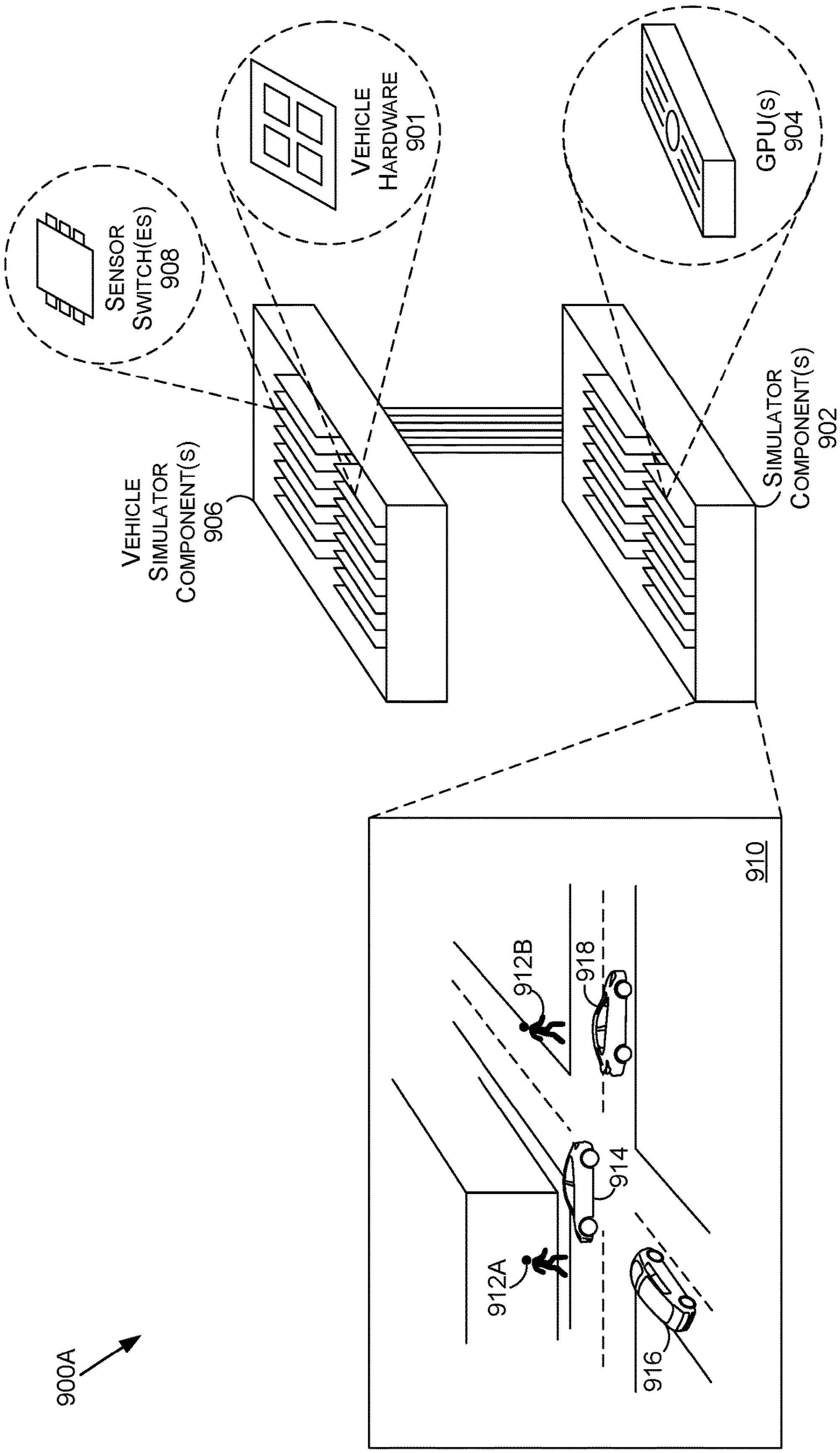
FIGS. 9A-9F are example illustrations of a simulation system, in accordance with some embodiments of the present disclosure.

Now referring to FIG. 9A, FIG. 9A is an example illustration of a simulation system 900A, in accordance with some embodiments of the present disclosure. The simulation system 900A may generate a simulated environment 910 (for example, a simulated traffic environment) that may include AI objects 912 (e.g., AI objects 912A and 912B), HIL objects 914, SIL objects 916, PIL objects 918, and/or other object types. The simulated environment 910 may include features of a driving environment, such as roads, bridges, tunnels, street signs, stop lights, crosswalks, buildings, trees and foliage, the sun, the moon, reflections, shadows, etc., in an effort to simulate a real-world environment accurately within the simulated environment 910. In some examples, the features of the driving environment within the simulated environment 910 may be more true-to-life by including chips, paint, graffiti, wear and tear, damage, etc. Although described with respect to a driving environment, this is not intended to be limiting, and the simulated environment may include an indoor environment (e.g., for a robot, a drone, etc.), an aerial environment (e.g., for a UAV, a drone, an airplane, etc.), an aquatic environment (e.g., for a boat, a ship, a submarine, etc.), and/or another environment type.

The simulated environment 910 may be generated using virtual data, real-world data, or a combination thereof. For example, the simulated environment may include real-world data augmented or changed using virtual data to generate combined data that may be used to simulate certain scenarios or situations with different and/or added elements (e.g., additional AI objects, environmental features, weather conditions, etc.). For example, pre-recorded video may be augmented or changed to include additional pedestrians, obstacles, and/or the like, such that the virtual objects (e.g., executing the software stack(s) 903 as HIL objects and/or SIL objects) may be tested against variations in the real-world data.

The simulated environment may be generated using rasterization, ray-tracing, using DNNs such as generative adversarial networks (GANs), another rendering technique, and/or a combination thereof. For example, in order to create more true-to-life, realistic lighting conditions (e.g., shadows, reflections, glare, global illumination, ambient occlusion, etc.), the simulation system 900A may use real-time ray-tracing. In one or more embodiments, one or more hardware accelerators may be used by the simulation system 900A to perform real-time ray-tracing. The ray-tracing may be used to simulate LIDAR sensor for accurate generation of LIDAR data. For example, ray casting may be used in an effort to simulate LIDAR reflectivity. In another example, virtual LIDAR data may be generated using a learned sensor model, as described in more detail above. In any example, ray-tracing techniques used by the simulation system 900A may include one or more techniques described in U.S. Provisional Patent Application No. 62/644,385, filed Mar. 17, 2018, U.S. Provisional Patent Application No. 62/644,386, filed Mar. 17, 2018, U.S. Provisional Patent Application No. 62/644,601, filed Mar. 19, 2018, and U.S. Provisional Application No. 62/644,806, filed Mar. 19, 2018, U.S. Non-Provisional patent application Ser. No. 16/354,983, filed on Mar. 15, 2019, and/or U.S. Non-Provisional patent application Ser. No. 16/355,214, filed on Mar. 15, 2019, each of which is hereby incorporated by reference in its entirety.

In some examples, the simulated environment may be rendered, at least in part, using one or more DNNs, such as generative adversarial neural networks (GANs). For example, real-world data may be collected, such as real-world data captured by autonomous vehicles (e.g., camera(s), LIDAR sensor(s), RADAR sensor(s), etc.), robots, and/or other objects, as well as real-world data that may be captured by any sensors (e.g., images or video pulled from data stores, online resources such as search engines, etc.). The real-world data may then be segmented, classified, and/or categorized, such as by labeling differing portions of the real-world data based on class (e.g., for an image of a landscape, portions of the image—such as pixels or groups of pixels—may be labeled as car, sky, tree, road, building, water, waterfall, vehicle, bus, truck, sedan, etc.). A GAN (or other DNN or machine learning model) may then be trained using the segmented, classified, and/or categorized data to generate new versions of the different types of objects, landscapes, and/or other features as graphics within the simulated environment.

In some embodiments, the simulator component(s) 902 may at least in part implement the driving environment simulator 120. The simulator component(s) 902 of the simulation system 900 may communicate with vehicle simulator component(s) 906 over a wired and/or wireless connection. In some examples, the connection may be a wired connection using one or more sensor switches 908, where the sensor switches may provide low-voltage differential signaling (LVDS) output. For example, the sensor data (e.g., image data) may be transmitted over an HDMI to LVDS connection between the simulator component(s) 902 and the vehicle simulator component(s) 906. The simulator component(s) 902 may include any number of compute nodes (e.g., computers, servers, etc.) interconnected in order to ensure synchronization of the world state. In some examples, as described herein, the communication between each of the compute nodes (e.g., the vehicle simulator component(s) compute nodes and the simulator component(s) compute nodes) may be managed by a distributed shared memory (DSM) system (e.g., DSM 924 of FIG. 9C) using a distributed shared memory protocol (e.g., a coherence protocol). The DSM may include a combination of hardware (cache coherence circuits, network interfaces, etc.) and software. This shared memory architecture may separate memory into shared parts distributed among nodes and main memory, or distributing all memory between all nodes. In some examples, InfiniBand (IB) interfaces and associated communications standards may be used. For example, the communication between and among different nodes of the simulation system 900 (and/or 1000) may use IB.

The simulator component(s) 902 may include one or more GPUs 904. The virtual vehicle being simulated may include any number of sensors (e.g., virtual or simulated sensors) that may correspond to one or more of the sensors described herein at least with respect to FIGS. 11A-11C. Any or all of the sensors of the simulator component(s) 902 may be implemented using a corresponding learned sensor model, as described in more detail above. In some examples, each sensor of the vehicle may correspond to, or be hosted by, one of the GPUs 904. For example, processing for a LIDAR sensor may be executed on a first GPU 904, processing for a wide-view camera may be executed on a second GPU 904, processing for a RADAR sensor may be executed on a third GPU, and so on. As such, the processing of each sensor with respect to the simulated environment may be capable of executing in parallel with each other sensor using a plurality of GPUs 904 to enable real-time simulation. In other examples, two or more sensors may correspond to, or be hosted by, one of the GPUs 904. In such examples, the two or more sensors may be processed by separate threads on the GPU 904 and may be processed in parallel. In other examples, the processing for a single sensor may be distributed across more than one GPU. In addition to, or alternatively from, the GPU(s) 904, one or more TPUs, CPUs, and/or other processor types may be used for processing the sensor data.

Figure 9B:
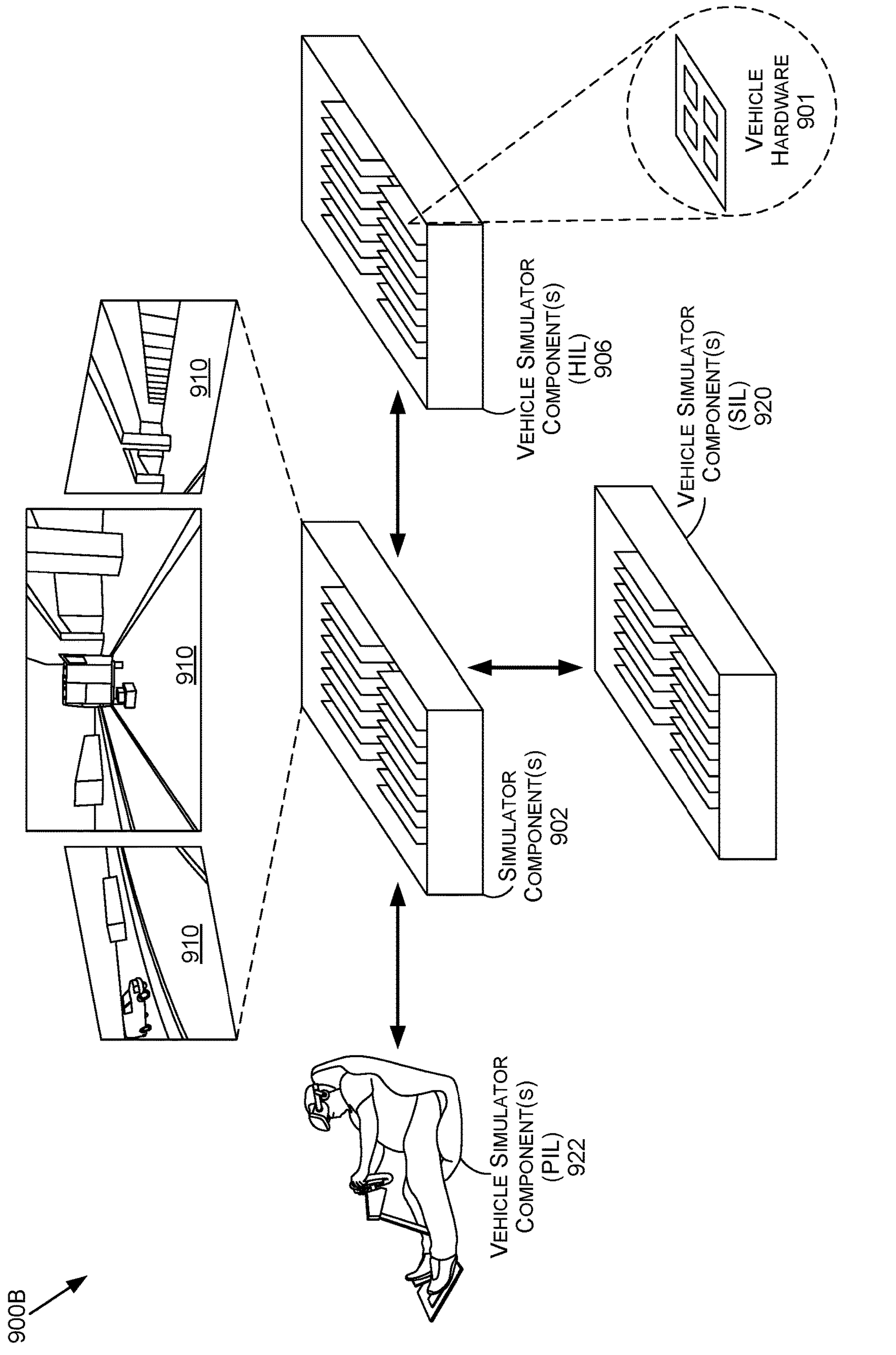
Figure 9C:
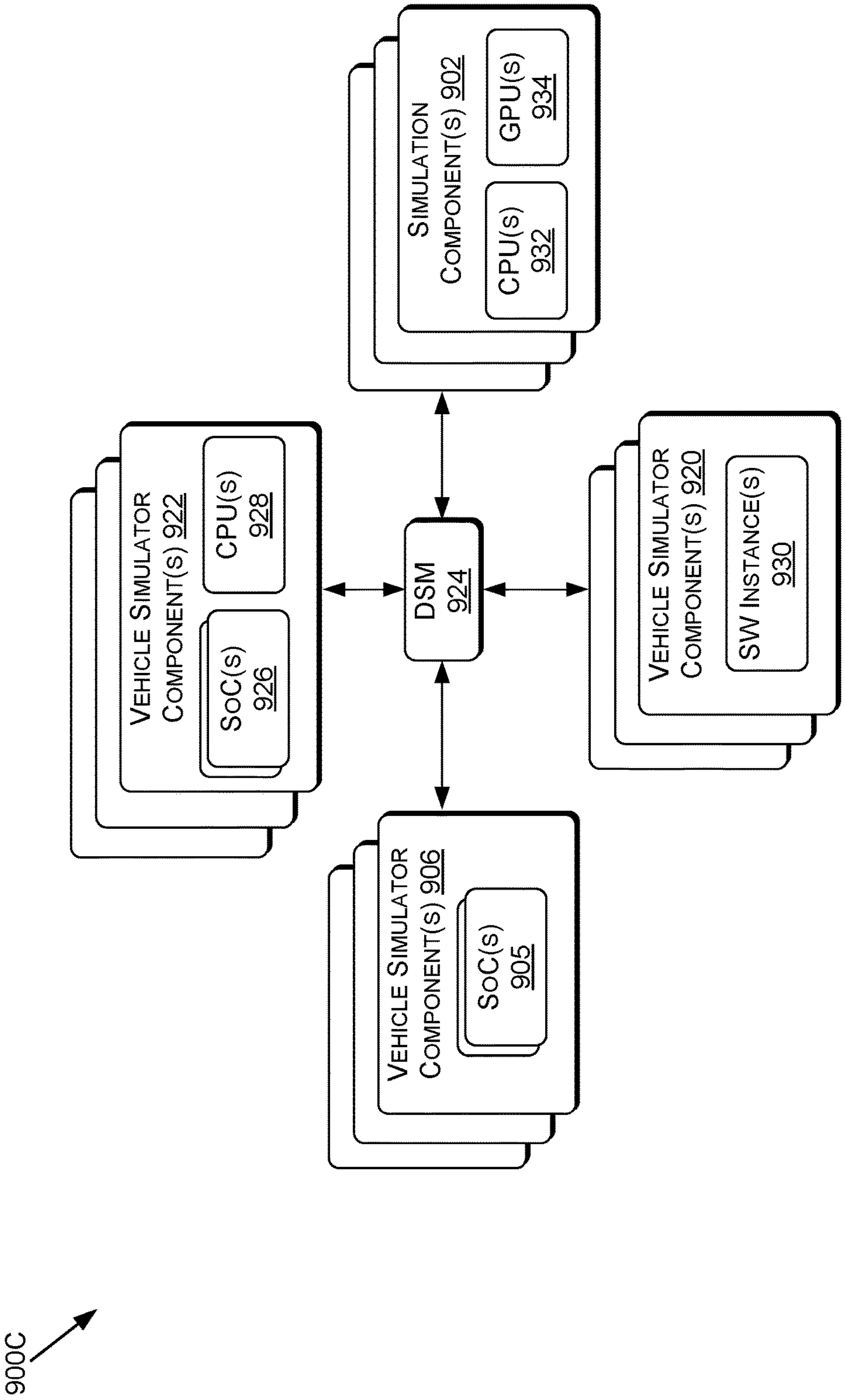

Vehicle simulator component(s) 906 may include a compute node of the simulation system 900A that corresponds to a single vehicle represented in the simulated environment 910. Each other vehicle (e.g., 914, 918, 916, etc.) may include a respective node of the simulation system. As a result, the simulation system 900A may be scalable to any number of vehicles or objects as each vehicle or object may be hosted by, or managed by, its own node in the system 900A. In the illustration of FIG. 9A, the vehicle simulator component(s) 906 may correspond to a HIL vehicle (e.g., because the vehicle hardware 901 is used). However, this is not intended to be limiting and, as illustrated in FIGS. 9B and 9C, the simulation system 900 may include SIL vehicles, HIL vehicles, PIL vehicles, and/or AI vehicles. The simulator component(s) 902 (e.g., simulator host device) may include one or more compute nodes of the simulation system 900A, and may host the simulation of the environment with respect to each actor (e.g., with respect to each HIL, SIL, PIL, and AI actors), as well as hosting the rendering and management of the environment or world state (e.g., the road, signs, trees, foliage, sky, sun, lighting, etc.). In some examples, the simulator component(s) 902 may include a server(s) and associated components (e.g., CPU(s), GPU(s), computers, etc.) that may host a simulator (e.g., NVIDIA's DRIVE™ Constellation AV Simulator).

The vehicle hardware 901, as described herein, may correspond to the vehicle hardware that may be used in a physical vehicle. However, in the simulation system 900A, the vehicle hardware 901 may be incorporated into the vehicle simulator component(s) 906. As such, because the vehicle hardware 901 may be configured for installation within the vehicle, the simulation system 900A may be specifically configured to use the vehicle hardware 901 within a node (e.g., of a server platform) of the simulation system 900A. For example, similar interfaces used in the physical vehicle may need to be used by the vehicle simulator component(s) 906 to communicate with the vehicle hardware 901. In some examples, the interfaces may include: (1) CAN interfaces, including a PCAN adapter, (2) Ethernet interfaces, including RAW UDP sockets with IP address, origin, VLA, and/or source IP all preserved, (3) Serial interfaces, with a USB to serial adapter, (4) camera interfaces, (5) InfiniB and (IB) interfaces, and/or other interface types.

In any examples, once the sensor data representative of a field(s) of view of the sensor(s) of the vehicle in the simulated environment has been generated and/or processed (e.g., using one or more codecs, as described herein), the sensor data (and/or encoded sensor data) may be used by the software stack(s) 903 (e.g., the autonomous driving software stack) executed on the vehicle hardware 901 to perform one or more operations (e.g., generate one or more controls, route planning, detecting objects, identifying drivable free-space, monitoring the environment for obstacle avoidance, etc.). As a result, the identical, or substantially identical, hardware components used by the vehicle (e.g., a physical vehicle) to execute the autonomous driving software stack in real-world environments may be used to execute the autonomous driving software stack in the simulated environment 910. The use of the vehicle hardware 901 in the simulation system 900A thus provides for a more accurate simulation of how the vehicle will perform in real-world situations, scenarios, and environments without having to actually find and test the vehicle in the real-world. This may reduce the amount of driving time required for testing the hardware/software combination used in the physical vehicle and may reduce safety risks by not requiring actual real-world testing (especially for dangerous situations, such as other vehicles driving erratically or at unsafe speeds, children playing in the street, ice on a bridge, etc.).

In addition to the vehicle hardware 901, the vehicle simulator component(s) 906 may manage the simulation of the vehicle (or other object) using additional hardware, such as a computer—e.g., an X86 box. In some examples, additional processing for virtual sensors (e.g., learned sensor models) of the virtual object may be executed using the vehicle simulation component(s) 906. In such examples, at least some of the processing may be performed by the simulator component(s) 902, and other of the processing may be executed by the vehicle simulator component(s) 906 (or 920, or 922, as described herein). In other examples, the processing of the virtual sensors may be executed entirely on the vehicle simulator component(s) 906.

Now referring to FIG. 9B, FIG. 9B is another example illustration of a simulation system 900B, in accordance with some embodiments of the present disclosure. The simulation system 900B may include the simulator component(s) 902 (as one or more compute nodes), the vehicle simulator component(s) 906 (as one or more compute nodes) for a HIL object(s), the vehicle simulator component(s) 920 (as one or more compute nodes) for a SIL object(s), the vehicle simulator component(s) 906 (as one or more compute nodes) for a PIL object(s), and/or additional component(s) (or compute nodes) for AI objects and/or other object types. Each of the PIL, HIL, SIL, AI, and/or other object type compute nodes may communicate with the simulator component(s) 902 to capture from the global simulation at least data that corresponds to the respective object within the simulate environment 910.

For example, the vehicle simulator component(s) 922 may receive (e.g., retrieve, obtain, etc.), from the global simulation (e.g., represented by the simulated environment 910) hosted by the simulator component(s) 902, data that corresponds to, is associated with, and/or is required by the vehicle simulator component(s) 922 to perform one or more operations by the vehicle simulator component(s) 922 for the PIL object. In such an example, data (e.g., virtual sensor data corresponding to a field(s) of view of virtual camera(s) of the virtual vehicle, virtual LIDAR data, virtual RADAR data, virtual location data, virtual IMU data, etc.) corresponding to each sensor of the PIL object may be received from the simulator component(s) 902. This data may be used to generate an instance of the simulated environment corresponding to the field of view of a remote operator of the virtual vehicle controlled by the remote operator, and the portion of the simulated environment may be projected on a display (e.g., a display of a VR headset, a computer or television display, etc.) for assisting the remote operator in controlling the virtual vehicle through the simulated environment 910. The controls generated or input by the remote operator using the vehicle simulator component(s) 922 may be transmitted to the simulator component(s) 902 for updating a state of the virtual vehicle within the simulated environment 910.

As another example, the vehicle simulator component(s) 920 may receive (e.g., retrieve, obtain, etc.), from the global simulation hosted by the simulator component(s) 902, data that corresponds to, is associated with, and/or is required by the vehicle simulator component(s) 920 to perform one or more operations by the vehicle simulator component(s) 920 for the SIL object. In such an example, data (e.g., virtual sensor data corresponding to a field(s) of view of virtual camera(s) of the virtual vehicle, virtual LIDAR data, virtual RADAR data, virtual location data, virtual IMU data, etc.) corresponding to each sensor of the SIL object may be received from the simulator component(s) 902. This data may be used to generate an instance of the simulated environment for each sensor (e.g., a first instance from a field of view of a first virtual camera of the virtual vehicle, a second instance from a field of view of a second virtual camera, a third instance from a field of view of a virtual LIDAR sensor, etc.). The instances of the simulated environment may thus be used to generate sensor data for each sensor by the vehicle simulator component(s) 920. In some examples, the sensor data may be encoded using one or more codecs (e.g., each sensor may use its own codec, or each sensor type may use its own codec) in order to generate encoded sensor data that may be understood or familiar to an autonomous driving software stack simulated or emulated by the vehicle simulator component(s) 920. For example, a first vehicle manufacturer may use a first type of LIDAR data, a second vehicle manufacturer may use a second type of LIDAR data, etc., and thus the codecs may customize the sensor data to the types of sensor data used by the manufacturers. As a result, the simulation system 900 may be universal, customizable, and/or useable by any number of different sensor types depending on the types of sensors and the corresponding data types used by different manufacturers. In any example, the sensor data and/or encoded sensor data may be used by an autonomous driving software stack to perform one or more operations (e.g., object detection, path planning, control determinations, actuation types, etc.). For example, the sensor data and/or encoded data may be used as inputs to one or more DNNs of the autonomous driving software stack, and the outputs of the one or more DNNs may be used for updating a state of the virtual vehicle within the simulated environment 910. As such, the reliability and efficacy of the autonomous driving software stack, including one or more DNNs, may be tested, fine-tuned, verified, and/or validated within the simulated environment.

In yet another example, the vehicle simulator component(s) 906 may receive (e.g., retrieve, obtain, etc.), from the global simulation hosted by the simulator component(s) 902, data that corresponds to, is associated with, and/or is required by the vehicle simulator component(s) 906 to perform one or more operations by the vehicle simulator component(s) 906 for the HIL object. In such an example, data (e.g., virtual sensor data corresponding to a field(s) of view of virtual camera(s) of the virtual vehicle, virtual LIDAR data, virtual RADAR data, virtual location data, virtual IMU data, etc.) corresponding to each sensor of the HIL object may be received from the simulator component(s) 902. This data may be used to generate an instance of the simulated environment for each sensor (e.g., a first instance from a field of view of a first virtual camera of the virtual vehicle, a second instance from a field of view of a second virtual camera, a third instance from a field of view of a virtual LIDAR sensor, etc.). The instances of the simulated environment may thus be used to generate sensor data for each sensor by the vehicle simulator component(s) 920 (e.g., using a corresponding learned sensor model). In some examples, the sensor data may be encoded using one or more codecs (e.g., each sensor may use its own codec, or each sensor type may use its own codec) in order to generate encoded sensor data that may be understood or familiar to an autonomous driving software stack executing on the vehicle hardware 901 of the vehicle simulator component(s) 920. Similar to the SIL object described herein, the sensor data and/or encoded sensor data may be used by an autonomous driving software stack to perform one or more operations (e.g., object detection, path planning, control determinations, actuation types, etc.).

Now referring to FIG. 9C, FIG. 9C is another example illustration of a simulation system 900C, in accordance with some embodiments of the present disclosure. The simulation system 900C may include distributed shared memory (DSM) system 924, the simulator component(s) 902 (as one or more compute nodes), the vehicle simulator component (s) 906 (as one or more compute nodes) for a HIL object(s), the vehicle simulator component(s) 920 (as one or more compute nodes) for a SIL object(s), the vehicle simulator component(s) 906 (as one or more compute nodes) for a PIL object(s), and/or additional component(s) (or compute nodes) for AI objects and/or other object types (not shown). The simulation system 900C may include any number of HIL objects (e.g., each including its own vehicle simulator component(s) 906), any number of SIL objects (e.g., each including its own vehicle simulator component(s) 920), any number of PIL objects (e.g., each including its own vehicle simulator component(s) 922), and/or any number of AI objects (not shown, but may be hosted by the simulation component(s) 902 and/or separate compute nodes, depending on the embodiment).

The vehicle simulator component(s) 906 may include one or more SoC(s) 905 (or other components) that may be configured for installation and use within a physical vehicle. As such, as described herein, the simulation system 900C may be configured to use the SoC(s) 905 and/or other vehicle hardware 901 by using specific interfaces for communicating with the SoC(s) 905 and/or other vehicle hardware. The vehicle simulator component(s) 920 may include one or more software instances 930 that may be hosted on one or more GPUs and/or CPUs to simulate or emulate the SoC(s) 905. The vehicle simulator component(s) 922 may include one or more SoC(s) 926, one or more CPU(s) 928 (e.g., X86 boxes), and/or a combination thereof, in addition to the component(s) that may be used by the remote operator (e.g., keyboard, mouse, joystick, monitors, VR systems, steering wheel, pedals, in-vehicle components, such as light switches, blinkers, HMI display(s), etc., and/or other component(s)).

The simulation component(s) 902 may include any number of CPU(s) 932 (e.g., X86 boxes), GPU(s), and/or a combination thereof. The CPU(s) 932 may host the simulation software for maintaining the global simulation, and the GPU(s) 934 may be used for rendering, physics, and/or other functionality for generating the simulated environment 910.

As described herein, the simulation system 900C may include the DSM 924. The DSM 924 may use one or more distributed shared memory protocols to maintain the state of the global simulation using the state of each of the objects (e.g., HIL objects, SIL objects, PIL objects, AI objects, etc.). As such, each of the compute nodes corresponding to the vehicle simulator component(s) 906, 920, and/or 922 may be in communication with the simulation component(s) 902 via the DSM 924. By using the DSM 924 and the associated protocols, real-time simulation may be possible. For example, as opposed to how network protocols (e.g., TCP, UDP, etc.) are used in massive multiplayer online (MMO) games, the simulation system 900 may use a distributed shared memory protocol to maintain the state of the global simulation and each instance of the simulation (e.g., by each vehicle, object, and/or sensor) in real-time.

Figure 9D:
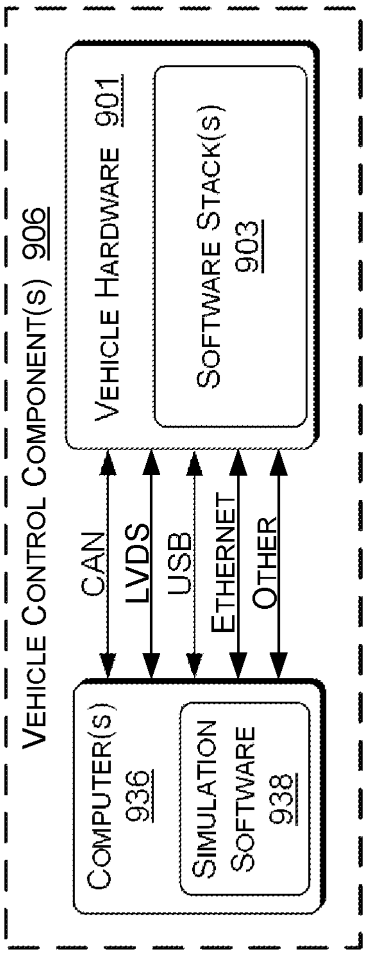

Now referring to FIG. 9D, FIG. 9D is an example illustration of a hardware-in-the-loop configuration, in accordance with some embodiments of the present disclosure. The vehicle simulator component(s) 906 may include the vehicle hardware 901, as described herein, and may include one or more computer(s) 936, one or more GPU(s) (not shown), and/or one or more CPU(s) (not shown). The computer(s) 936, GPU(s), and/or CPU(s) may manage or host the simulation software 938, or instance thereof, executing on the vehicle simulator component(s) 906. The vehicle hardware 901 may execute the software stack(s) 903 (e.g., an autonomous driving software stack, an IX software stack, etc.).

As described herein, by using the vehicle hardware 901, the other vehicle simulator component(s) 906 within the simulation environment 900 may need to be configured for communication with the vehicle hardware 901. For example, because the vehicle hardware 901 may be configured for installation within a physical vehicle (e.g., the vehicle), the vehicle hardware 901 may be configured to communicate over one or more connection types and/or communication protocols that are not standard in computing environments (e.g., in server-based platforms, in general-purpose computers, etc.). For example, a CAN interface, LVDS interface, USB interface, Ethernet interface, InfiniB and (IB) interface, and/or other interfaces may be used by the vehicle hardware 901 to communicate signals with other components of the physical vehicle. As such, in the simulation system 900, the vehicle simulator component(s) 906 (and/or other component(s) of the simulation system 900 in addition to, or alternative from, the vehicle simulator component(s) 906) may need to be configured for use with the vehicle hardware 901. In order to accomplish this, one or more CAN interfaces, LVDS interfaces, USB interfaces, Ethernet interfaces, and/or other interface may be used to provide for communication (e.g., over one or more communication protocols, such as LVDS) between vehicle hardware 901 and the other component(s) of the simulation system 900.

In some examples, the virtual vehicle that may correspond to the vehicle simulator component(s) 906 within the simulation system 900 may be modeled as a game object within an instance of a game engine. In addition, each of the virtual sensors of the virtual vehicle may be interfaced using sockets within the virtual vehicle's software stack(s) 903 executed on the vehicle hardware 901. In some examples, each of the virtual sensors of the virtual vehicle may include an instance of the game engine, in addition to the instance of the game engine associated with the simulation software 938 for the virtual vehicle. In examples where the vehicle simulator component(s) 906 include a plurality of GPUs, each of the sensors may be executed on a single GPU. In other examples, multiple sensors may be executed on a single GPU, or at least as many sensors as feasible to ensure real-time generation of the virtual sensor data.

Using HIL objects in the simulator system 900 may provide for a scalable solution that may simulate or emulate various driving conditions for autonomous software and hardware systems (e.g., NVIDIA's DRIVE AGX Pegasus™ compute platform and/or DRIVE PX Xavier™ compute platform). Some benefits of HIL objects may include the ability to test DNNs faster than real-time, the ability to scale verification with computing resources (e.g., rather than vehicles or test tracks), the ability to perform deterministic regression testing (e.g., the real-world environment is never the same twice, but a simulated environment can be), optimal ground truth labeling (e.g., no hand-labeling required), the ability to test scenarios difficult to produce in the real-world, rapid generation of test permutations, and the ability to test a larger space of permutations in simulation as compared to real-world.

Figure 9E:
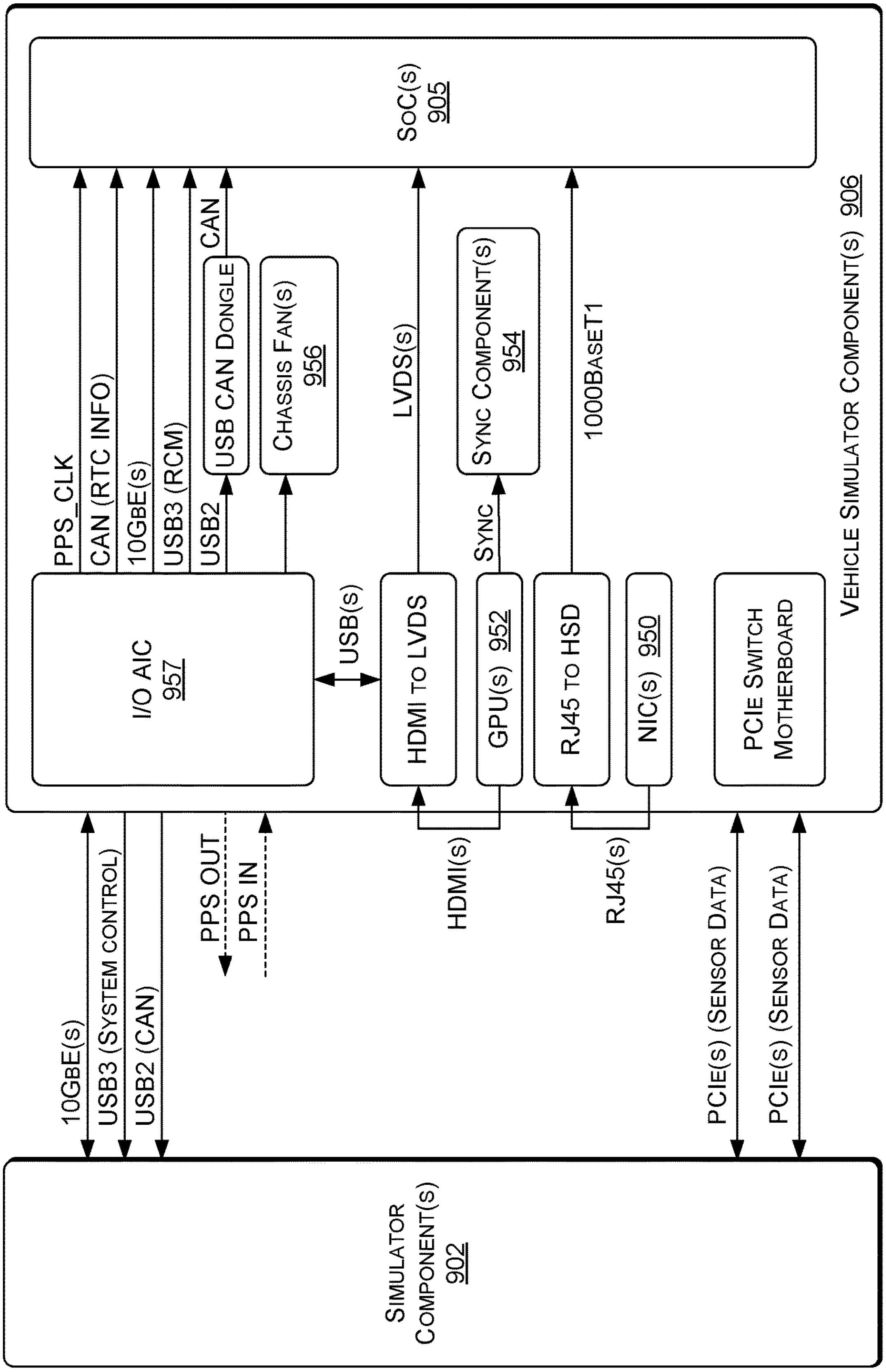

Now referring to FIG. 9E, FIG. 9E is an example illustration of a hardware-in-the-loop configuration, in accordance with some embodiments of the present disclosure. The HIL configuration of FIG. 9E may include vehicle simulator component(s) 906, including the SoC(s) 905, a chassis fan(s) 956 and/or water-cooling system. The HIL configuration may include a two-box solution (e.g., the simulator component(s) 902 in a first box and the vehicle simulator component(s) 906 in a second box). Using this approach may reduce the amount of space the system occupies as well as reduce the number of external cables in data centers (e.g., by including multiple components together with the SoC(s) 905 in the vehicle simulator component(s) 906—e.g., the first box). The vehicle simulator component(s) 906 may include one or more GPUs 952 (e.g., NVIDIA QUADRO GPU(s)) that may provide, in an example, non-limiting embodiment, 8 DP/HDMI video streams that may be synchronized using sync component(s) 954 (e.g., through a QUADRO Sync II Card). These GPU(s) 952 (and/or other GPU types) may provide the sensor input to the SoC(s) 905 (e.g., to the vehicle hardware 901). In some examples, the vehicle simulator component(s) 906 may include a network interface (e.g., one or more network interface cards (NICs) 950) that may simulate or emulate RADAR sensors, LIDAR sensors, and/or IMU sensors (e.g., by providing 8 Gigabit ports with precision time protocol (PTP) support). In addition, the vehicle simulator component(s) 906 may include an input/output (I/O) analog integrated circuit 957. Registered Jack (RJ) interfaces (e.g., RJ45), high speed data (HSD) interfaces, USB interfaces, pulse per second (PPS) clocks, Ethernet (e.g., 10 Gb Ethernet (GbE)) interfaces, CAN interfaces, HDMI interfaces, and/or other interface types may be used to effectively transmit and communication data between and among the various component(s) of the system.

Figure 9F:
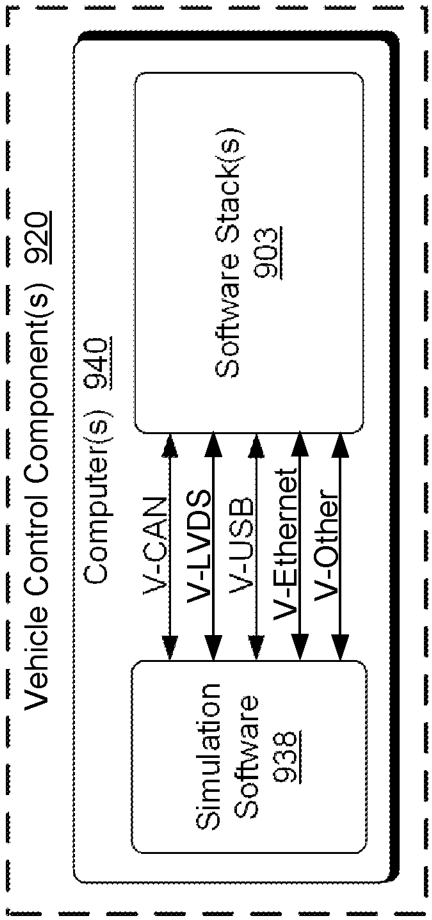

Now referring to FIG. 9F, FIG. 9F is an example illustration of a software-in-the-loop configuration, in accordance with some embodiments of the present disclosure. The vehicle simulator component(s) 920 may include computer(s) 940, GPU(s) (not shown), CPU(s) (not shown), and/or other components. The computer(s) 940, GPU(s), and/or CPU(s) may manage or host the simulation software 938, or instance thereof, executing on the vehicle simulator component(s) 920, and may host the software stack(s) 903. For example, the vehicle simulator component(s) 920 may simulate or emulate, using software, the vehicle hardware 901 in an effort to execute the software stack(s) 903 as accurately as possible.

In order to increase accuracy in SIL embodiments, the vehicle simulator component(s) 920 may be configured to communicate over one or more virtual connection types and/or communication protocols that are not standard in computing environments. For example, a virtual CAN interface, virtual LVDS interface, virtual USB interface, virtual Ethernet interface, and/or other virtual interfaces may be used by the computer(s) 940, CPU(s), and/or GPU(s) of the vehicle simulator component(s) 920 to provide for communication (e.g., over one or more communication protocols, such as LVDS) between the software stack(s) 903 and the simulation software 938 within the simulation system 900. For example, the virtual interfaces may include middleware that may be used to provide a continuous feedback loop with the software stack(s) 903. As such, the virtual interfaces may simulate or emulate the communications between the vehicle hardware 901 and the physical vehicle using one or more software protocols, hardware (e.g., CPU(s), GPU(s), computer(s) 940, etc.), or a combination thereof.

The computer(s) 940 in some examples, may include X86 CPU hardware, and one or more X86 CPUs may execute both the simulation software 938 and the software stack(s) 903. In other examples, the computer(s) 940 may include GPU hardware (e.g., an NVIDIA DGX system and/or cloud-based NVIDIA Tesla servers).

In some examples, the virtual vehicle that may correspond to the vehicle simulator component(s) 920 within the simulation system 900 may be modeled as a game object within an instance of a game engine. In addition, each of the virtual sensors of the virtual vehicle may be interfaced using sockets within the virtual vehicle's software stack(s) 903 executed on the vehicle simulator component(s) 920. In some examples, each of the virtual sensors of the virtual vehicle may include an instance of the game engine, in addition to the instance of the game engine associated with the simulation software 938 for the virtual vehicle. In examples where the vehicle simulator component(s) 906 include a plurality of GPUs, each of the sensors may be executed on a single GPU. In other examples, multiple sensors may be executed on a single GPU, or at least as many sensors as feasible to ensure real-time generation of the virtual sensor data.

Figure 10A:
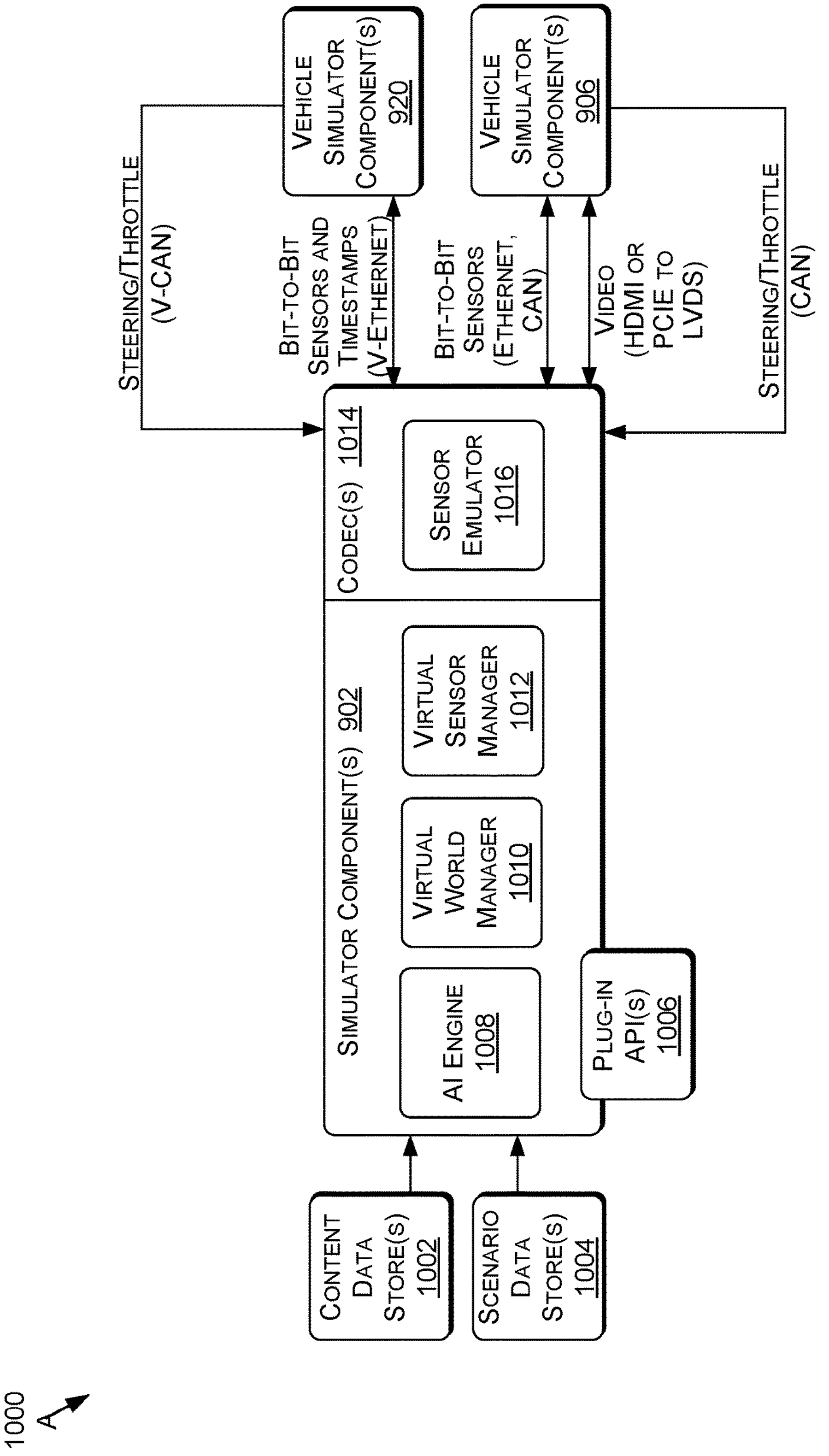
FIG. 10A is an example illustration of a simulation system at runtime, in accordance with some embodiments of the present disclosure.

Now referring to FIG. 10A, FIG. 10A is an example illustration of a simulation system 1000 at runtime, in accordance with some embodiments of the present disclosure. Some or all of the components of the simulation system 1000 may be used in the simulation system 900, and some or all of the components of the simulation system 900 may be used in the simulation system 1000. As such, components, features, and/or functionality described with respect to the simulation system 900 may be associated with the simulation system 1000, and vice versa. In addition, each of the simulation systems 1000A and 1000B (FIG. 10B) may include similar and/or shared components, features, and/or functionality.

The simulation system 1000A (e.g., representing one example of simulation system 1000) may include the simulator component(s) 902, codec(s) 1014, content data store(s) 1002, scenario data store(s) 1004, vehicle simulator component(s) 920 (e.g., for a SIL object), and vehicle simulator component(s) 906 (e.g., for a HIL object). The content data store(s) 1002 may include detailed content information for modeling cars, trucks, people, bicyclists, signs, buildings, trees, curbs, and/or other features of the simulated environment. The scenario data store(s) 1004 may include scenario information that may include dangerous scenario information (e.g., that is unsafe to test in the real-world environment), such as a child in an intersection.

The simulator component(s) 902 may include an AI engine 1008 that simulates traffic, pedestrians, weather, and/or other AI features of the simulated environment. The simulator component(s) 902 may include a virtual world manager 1010 that manages the world state for the global simulation. The simulator component(s) 902 may further include a virtual sensor manger 1012 that may mange the virtual sensors (any or all of which may be implemented using a corresponding learned sensor model). The AI engine 1008 may model traffic similar to how traffic is modeled in an automotive video game, and may be done using a game engine, as described herein. In some embodiments, the simulator component(s) 902 may implement the driving environment simulator 120 and the AI engine 1008 may model traffic using a motion prediction model 220 as described herein. In other examples, custom AI may be used to provide the determinism and computational level of detail necessary for large-scale reproducible automotive simulation. In some examples, traffic may be modeled using SIL objects, HIL objects, PIL objects, AI objects, and/or combination thereof. The system 1000 may create a subclass of an AI controller that examines map data, computes a route, and drives the route while avoiding other cars. The AI controller may compute desired steering, acceleration, and/or braking, and may apply those values to the virtual objects. The vehicle properties used may include mass, max RPM, torque curves, and/or other properties. A physics engine may be used to determine states of AI objects. As described herein, for vehicles or other objects that may be far away and may not have an impact on a current sensor(s), the system may choose not to apply physics for those objects and only determine locations and/or instantaneous motion vectors. Ray-casting may be used for each wheel to ensure that the wheels of the vehicles are in contact. In some examples, traffic AI may operate according to a script (e.g., rules-based traffic). Traffic AI maneuvers for virtual objects may include lateral lane changes (e.g., direction, distance, duration, shape, etc.), longitudinal movement (e.g., matching speed, relative target, delta to target, absolute value), route following, and/or path following. The triggers for the traffic AI maneuvers may be time-based (e.g., three seconds), velocity-based (e.g., at sixty mph), proximity-based to map (e.g., within twenty feet of intersection), proximity-based to actor (e.g., within twenty feet of another object), lane clear, and/or others.

The AI engine 1008 may model pedestrian AI similar to traffic AI, described herein, but for pedestrians. The pedestrians may be modeled similar to real pedestrians, and the system 1000 may infer pedestrian conduct based on learned behaviors.

The simulator component(s) 902 may be used to adjust the time of day such that street lights turn on and off, headlights turn on and off, shadows, glares, and/or sunsets are considered, etc. In some examples, only lights within a threshold distance to the virtual object may be considered to increase efficiency.

Weather may be accounted for by the simulator component(s) 902 (e.g., by the virtual world manager 1010). The weather may be used to update the coefficients of friction for the driving surfaces, and temperature information may be used to update tire interaction with the driving surfaces. Where rain or snow are present, the system 1000 may generate meshes to describe where rainwater and snow may accumulate based on the structure of the scene, and the meshes may be employed when rain or snow are present in the simulation.

In some examples, as described herein, at least some of the simulator component(s) 902 may alternatively be included in the vehicle simulator component(s) 920 and/or 906. For example, the vehicle simulator component(s) 920 and/or the vehicle simulator component(s) 906 may include the virtual sensor manager 1012 for managing each of the sensors of the associated virtual object. In addition, one or more of the codecs 1014 may be included in the vehicle simulator component(s) 920 and/or the vehicle simulator component(s) 906. In such examples, the virtual sensor manager 1012 may generate sensor data corresponding to a sensor of the virtual object (e.g., using a learned sensor model), and the sensor data may be used by sensor emulator 1016 of the codec(s) 1014 to encode the sensor data according to the sensor data format or type used by the software stack(s) 903 (e.g., the software stack(s) 903 executing on the vehicle simulator component(s) 920 and/or the vehicle simulator component(s) 906).

The codec(s) 1014 may provide an interface to the software stack(s) 903. The codec(s) 1014 (and/or other codec(s) described herein) may include an encoder/decoder framework. The codec(s) 1014 may include CAN steering, throttle requests, and/or may be used to send sensor data to the software stack(s) 903 in SIL and HIL embodiments. The codec(s) 1014 may be beneficial to the simulation systems described herein (e.g., 900 and 1000). For example, as data is produced by the re-simulation systems 100 and the simulation systems 900 and 1000, the data may be transmitted to the software stack(s) 903 such that the following standards may be met. The data may be transferred to the software stack(s) 903 such that minimal impact is introduced to the software stack(s) 903 and/or the vehicle hardware 901 (in HIL embodiments). This may result in more accurate simulations as the software stack(s) 903 and/or the vehicle hardware 901 may be operating in an environment that closely resembles deployment in a real-world environment. The data may be transmitted to the software stack(s) 903 such that the simulator and/or re-simulator may be agnostic to the actual hardware configuration of the system under test. This may reduce development overhead due to bugs or separate code paths depending on the simulation configuration. The data may be transmitted to the software stack(s) 903 such that the data may match (e.g., bit-to-bit) the data sent from a physical sensor of a physical vehicle (e.g., the vehicle). The data may be transmitted to efficiently in both SIL and HIL embodiments.

The sensor emulator 1016 may emulate at least cameras, LIDAR sensors, and/or RADAR sensors, any or all of which may be implemented using a corresponding learned sensor model. Using a learned sensor model may obviate the need to model the sensor using ray-tracing, although in some embodiments, ray-tracing may additionally or alternatively be used. With respect to LIDAR sensors, some LIDAR sensors report tracked objects. As such, for each frame represented by the virtual sensor data, the simulator component(s) 902 may create a list of all tracked objects (e.g., trees, vehicles, pedestrians, foliage, etc.) within range of the virtual object having the virtual LIDAR sensors, and may cast virtual rays toward the tracked objects. When a significant number of rays strike a tracked object, that object may be added to the report of the LIDAR data. In some examples, the LIDAR sensors may be modeled using simple ray-casting without reflection, adjustable field of view, adjustable noise, and/or adjustable drop-outs. LIDAR with moving parts, limited fields of view, and/or variable resolutions may be simulated. For example, the LIDAR sensors may be modeled as solid state LIDAR and/or as Optix-based LIDAR. In examples, using Optix-based LIDAR, the rays may bounce from water, reflective materials, and/or windows. Texture may be assigned to roads, signs, and/or vehicles to model laser reflection at the wavelengths corresponding to the textures. RADAR may be implemented similarly to LIDAR. As described herein, RADAR and/or LIDAR may be simulated using learned sensors, ray-tracing techniques, and/or otherwise.

In some examples, the vehicle simulator component(s) 906, 920, and/or 922 may include a feedback loop with the simulator component(s) 902 (and/or the component(s) that generate the virtual sensor data). The feedback loop may be used to provide information for updating the virtual sensor data capture or generation. For example, for virtual cameras, the feedback loop may be based on sensor feedback, such as changes to exposure responsive to lighting conditions (e.g., increase exposure in dim lighting conditions so that the image data may be processed by the DNNs properly). As another example, for virtual LIDAR sensors, the feedback loop may be representative of changes to energy level (e.g., to boost energy to produce more useable or accurate LIDAR data).

GNNS sensors (e.g., GPS sensors) may be simulated within the simulation space to generate real-world coordinates. In order to this, noise functions may be used to approximate inaccuracy. As with any virtual sensors described herein, the virtual sensor data may be generated using a learned sensor model or otherwise, and transmitted to the software stack(s) 903 using the codec(s) 1014 to be converted to a bit-to-bit correct signal (e.g., corresponding accurately to the signals generated by the physical sensors of the physical vehicles).

One or more plugin application programming interfaces (APIs) 1006 may be used. The plugin APIs 1006 may include first-party and/or third-party plugins. For example, third parties may customize the simulation system 1000B using their own plugin APIs 1006 for providing custom information, such as performance timings, suspension dynamics, tire dynamics, etc.

The plugin APIs 1006 may include an ego-dynamics component(s) (not shown) that may receive information from the simulator component(s) 902 including position, velocity, car state, and/or other information, and may provide information to the simulator component(s) 902 including performance timings, suspension dynamics, tire dynamics, and/or other information. For examples, the simulator component(s) 902 may provide CAN throttle, steering, and the driving surface information to the ego-dynamics component(s). In some examples, the ego-dynamics component(s) may include an off-the-shelf vehicle dynamics package (e.g., IPG CARMAKER or VIRTUAL TEST DRIVE), while in other examples the ego-dynamics component(s) may be customized and/or received (e.g., from a first-party and/or a third-party).

The plugin APIs 1006 may include a key performance indicator (KPI) API. The KPI API may receive CAN data, ground truth, and/or virtual object state information (e.g., from the software stack(s) 903) from the simulator component(s) 902 and may generate and/or provide a report (in real-time) that includes KPI's and/or commands to save state, restore state, and/or apply changes.

Figure 10B:
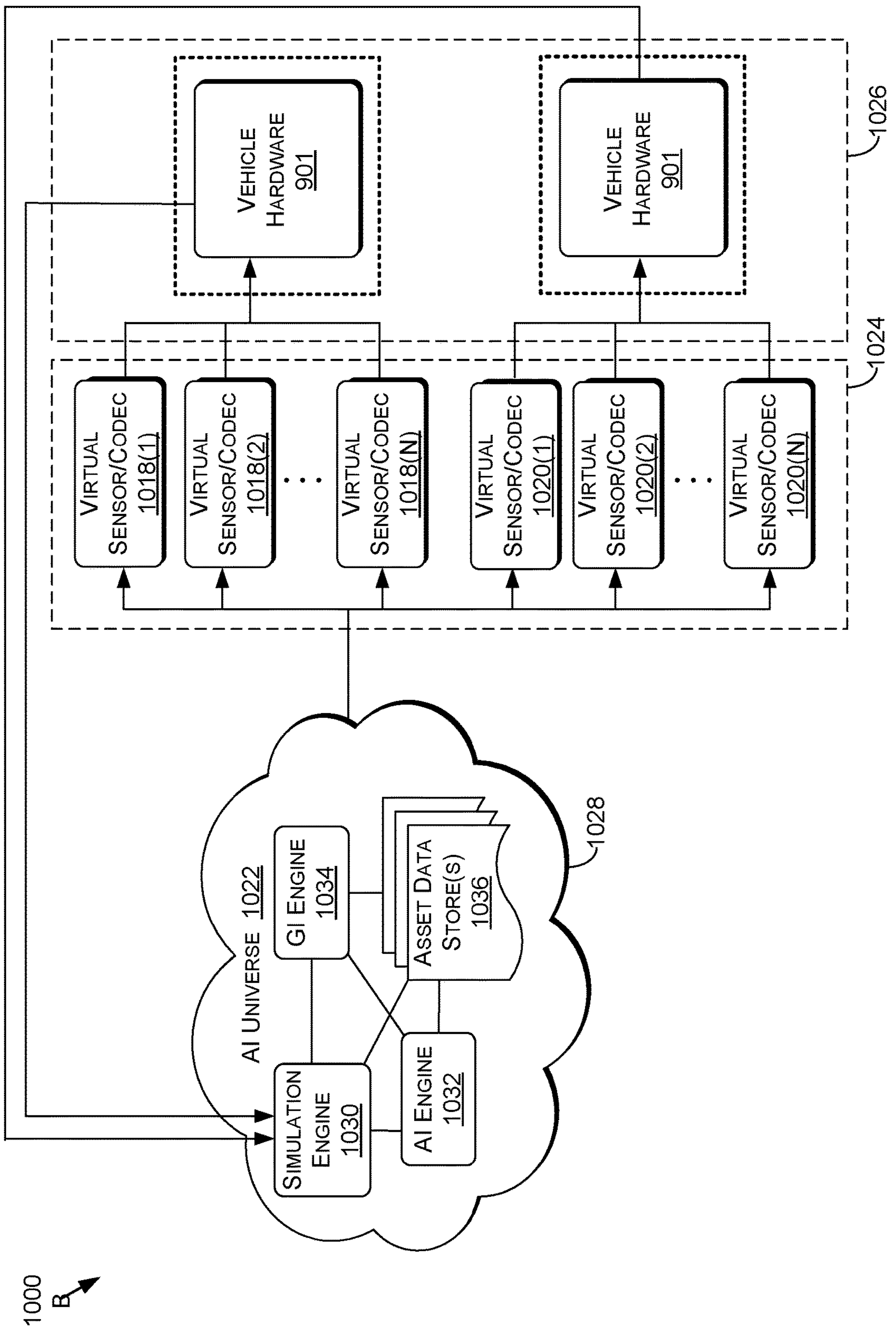
FIG. 10B includes a cloud-based architecture for a simulation system, in accordance with some embodiment of the present disclosure.

Now referring to FIG. 10B, FIG. 10B includes a cloud-based architecture for a simulation system 1000B, in accordance with some embodiment of the present disclosure. The simulation system 1000B may, at least partly, reside in the cloud and may communicate over one or more networks, such as but not limited to those described herein, with one or more GPU platforms 1024 (e.g., that may include GPUs, CPUs, TPUS, and/or other processor types) and/or one or more HIL platforms 1026 (e.g., which may include some or all of the components from the vehicle simulator component(s) 906, described herein).

A simulated environment 1028 (e.g., which may be similar to the simulated environment 910 described herein) may be modeled by interconnected components including a simulation engine 1030, an AI engine 1032, a global illumination (GI) engine 1034, an asset data store(s) 1036, and/or other components. In some examples, these component(s) may be used to model a simulated environment (e.g., a virtual world) in a virtualized interactive platform (e.g., similar to a massive multiplayer online (MMO) game environment. The simulated environment may further include physics, traffic simulation, weather simulation, and/or other features and simulations for the simulated environment. GI engine 1034 may calculate GI once and share the calculation with each of the nodes 1018(1)-1018(N) and 1020(1)-1020(N) (e.g., the calculation of GI may be view independent). The simulated environment 1028 may include an AI universe 1022 that provides data to GPU platforms 1024 (e.g., GPU servers) that may create renderings for each sensor of the vehicle (e.g., at the virtual sensor/codec(s) 1018 for a first virtual object and at the virtual sensor codec(s) 1020 for a second virtual object). For example, the GPU platform 1024 may receive data about the simulated environment 1028 and may create sensor inputs for each of 1018(1)-1018(N), 1020(1)-1020(N), and/or virtual sensor/codec pairs corresponding to other virtual objects (depending on the embodiment). In examples where the virtual objects are simulated using HIL objects, the sensor inputs may be provided to the vehicle hardware 901 which may use the software stack(s) 903 to perform one or more operations and/or generate one or more commands, such as those described herein. In some examples, as described herein, the virtual sensor data from each of the virtual sensors may be encoded using a codec prior to being used by (or transmitted to) the software stack(s) 903. In addition, in some examples, each of the sensors may be executed on its own GPU within the GPU platform 1024, while in other examples, two or more sensors may share the same GPU within the GPU platform 1024.

The one or more operations or commands may be transmitted to the simulation engine 1030 which may update the behavior of one or more of the virtual objects based on the operations and/or commands. For example, the simulation engine 1030 may use the AI engine 1032 to update the behavior of the AI agents as well as the virtual objects in the simulated environment 1028. The simulation engine 1030 may then update the object data and characteristics (e.g., within the asset data store(s) 1036), may update the GI (and/or other aspects such as reflections, shadows, etc.), and then may generate and provide updated sensor inputs to the GPU platform 1024. This process may repeat until a simulation is completed.

The systems and methods described herein may be used for training, testing, and/or simulation of, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as those used for training, testing, and/or simulation, of automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 11A:
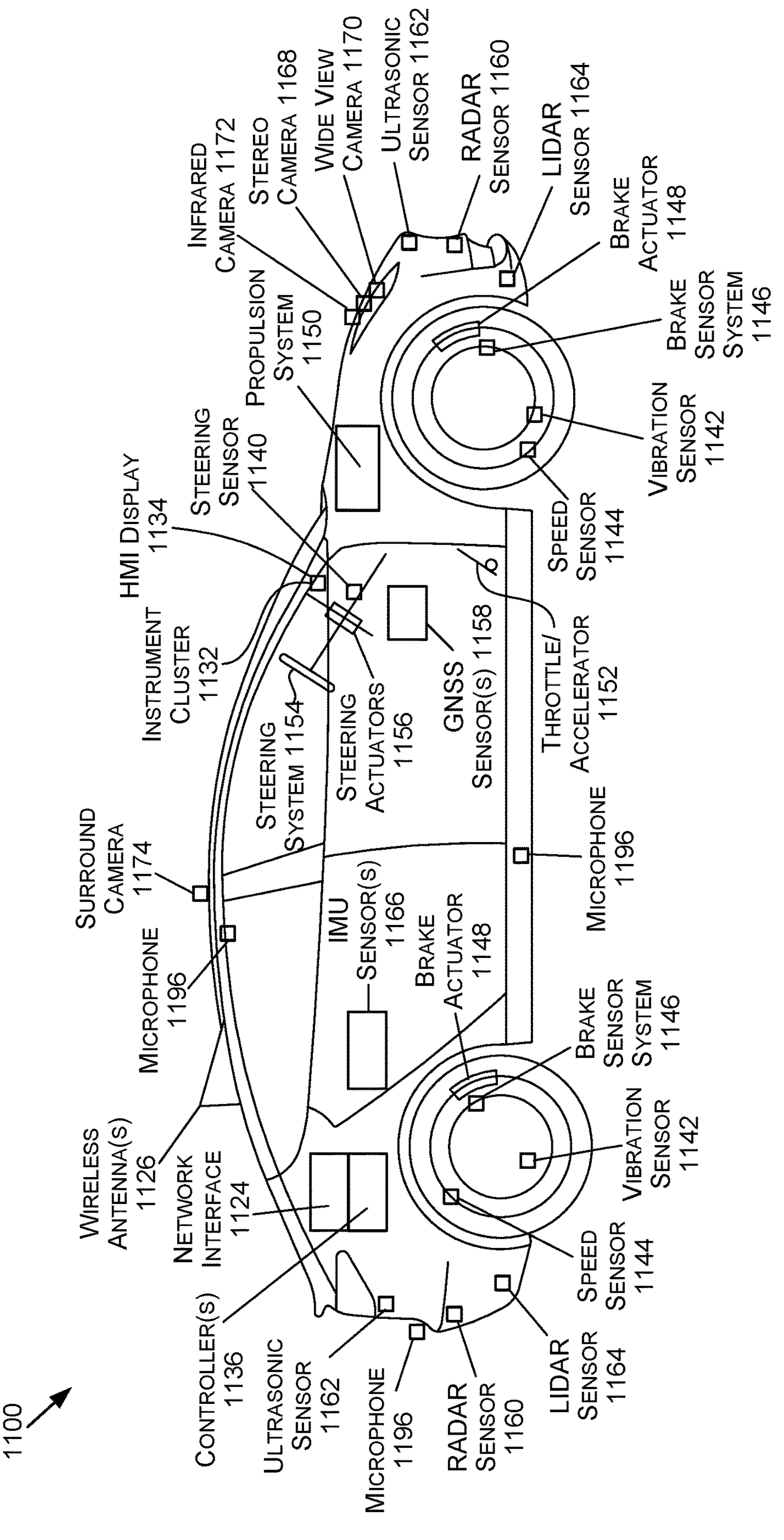
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems ("GNSS") sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the High Definition ("HD") map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1126 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 11B:
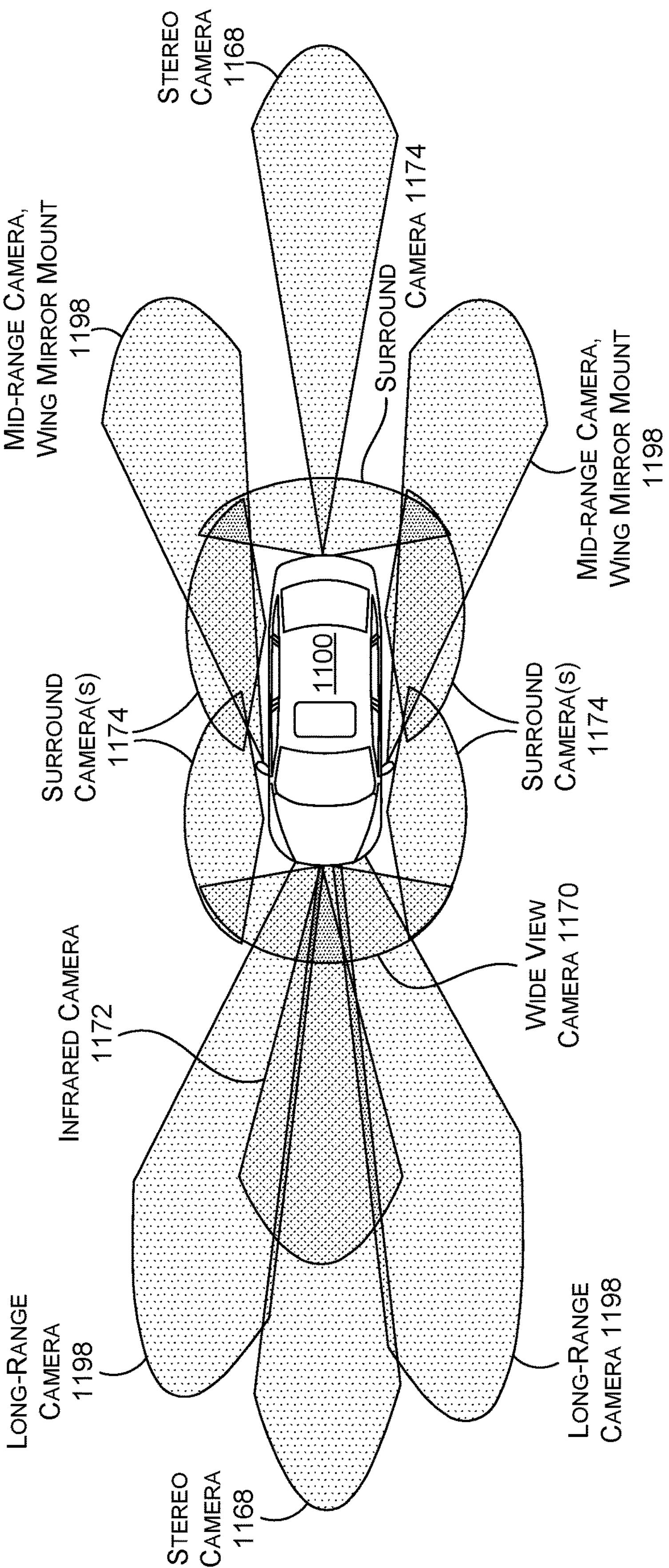
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may be any number (including zero) of wide-view cameras 1170 on the vehicle 1100. In addition, any number of long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

Any number of stereo cameras 1168 may also be included in a front-facing configuration. In at least one embodiment, one or more of stereo camera(s) 1168 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
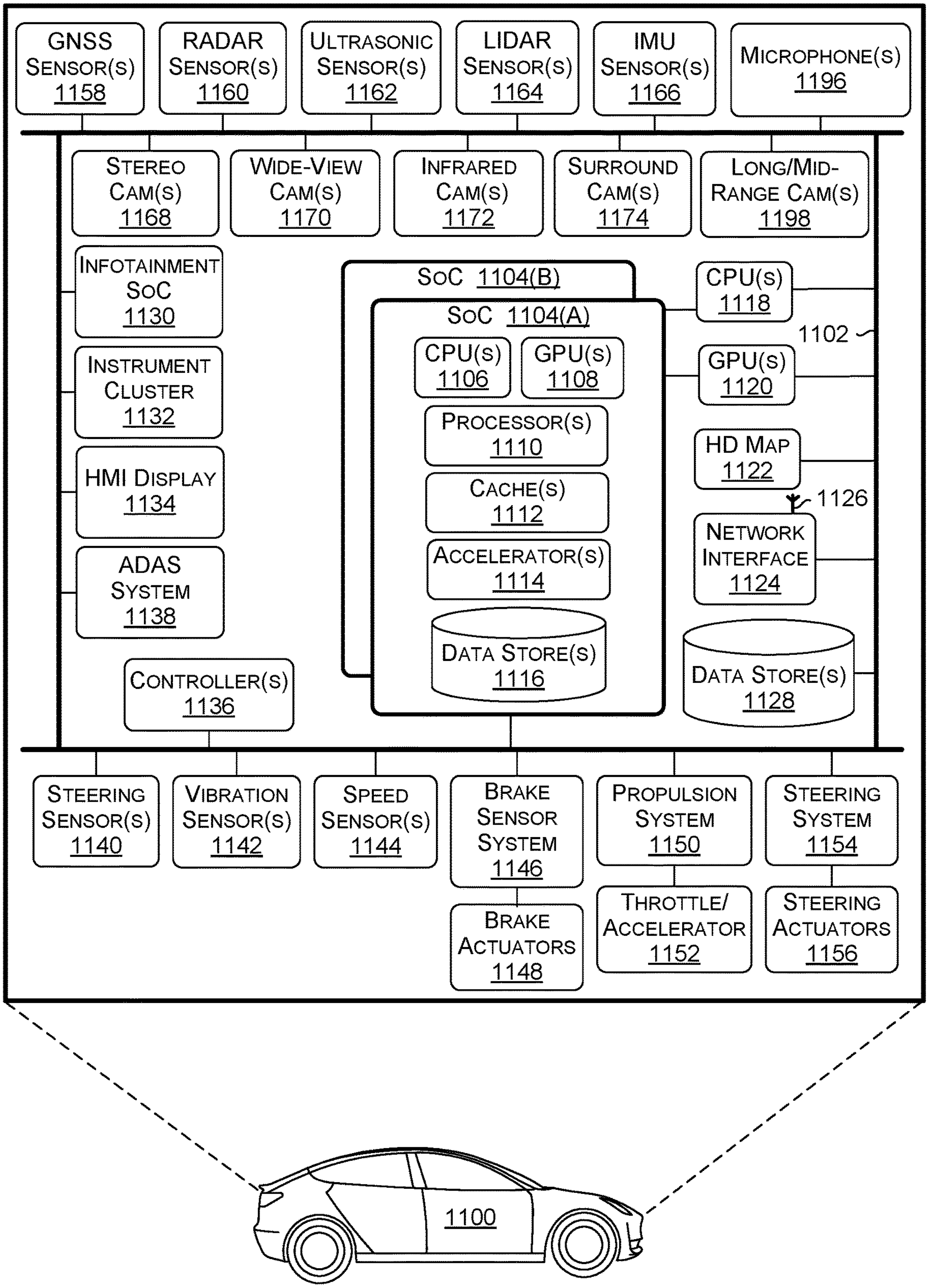
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example.

In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
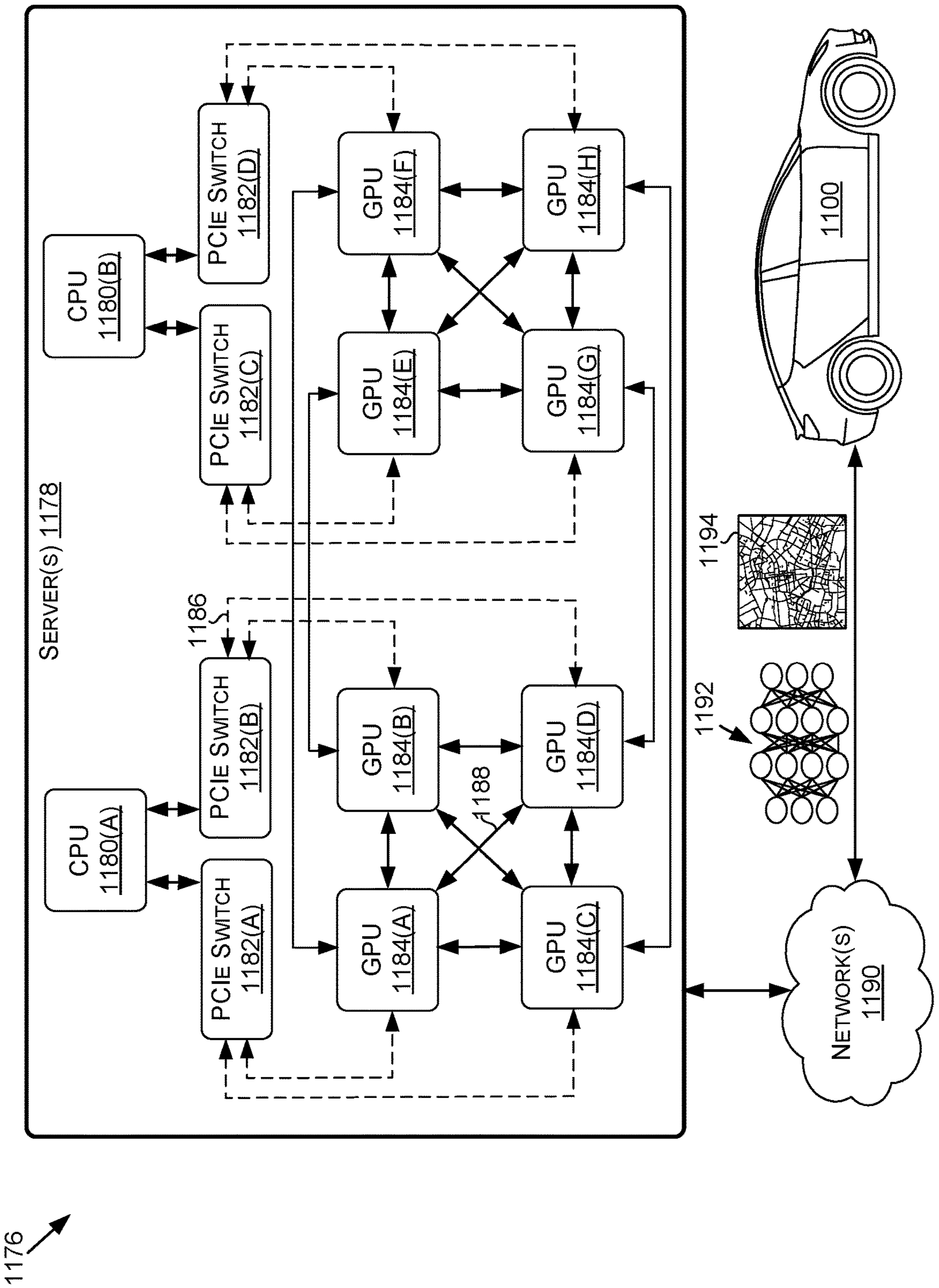
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
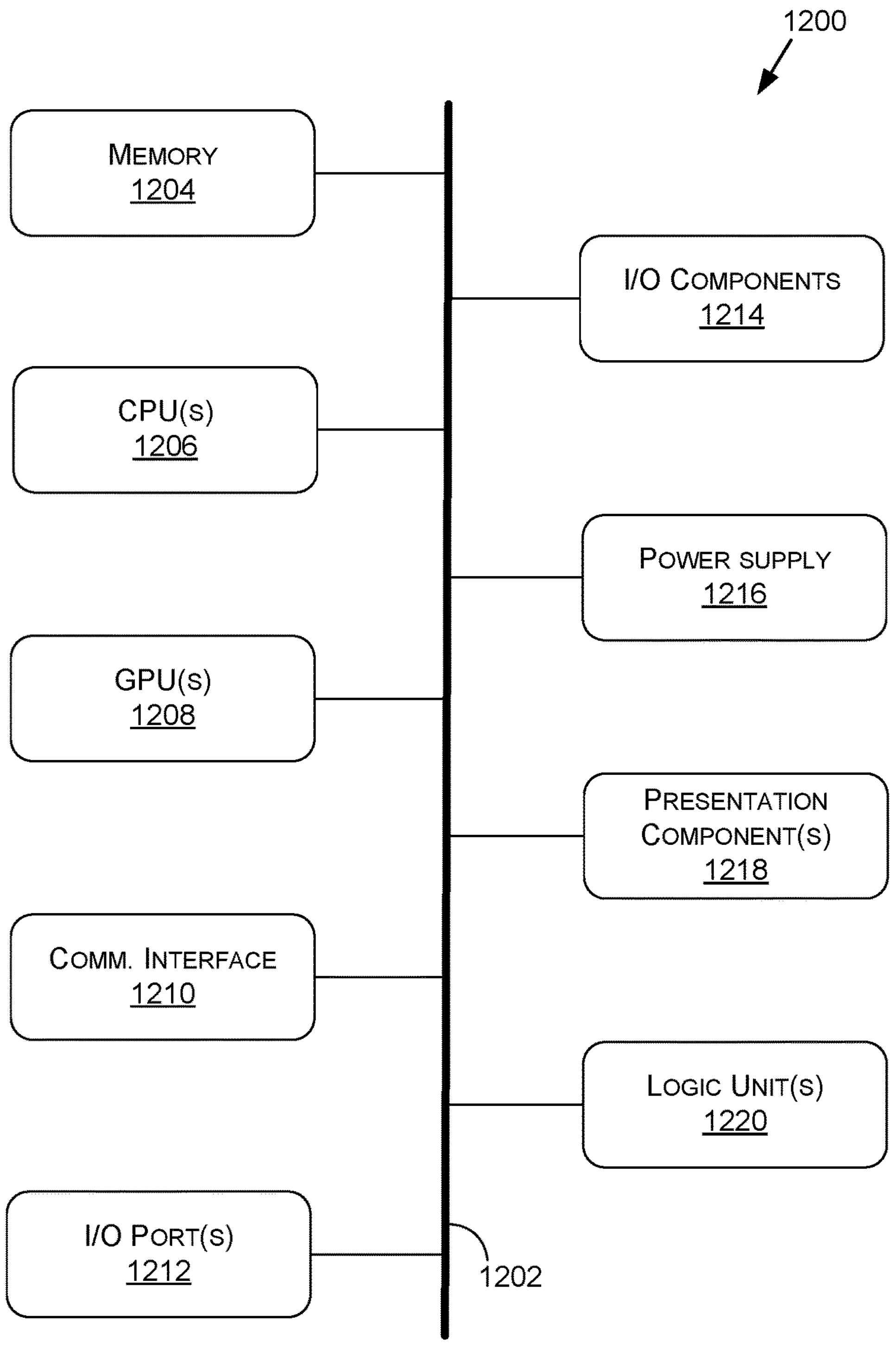
FIG. 12 is a block diagram of an example computing device suitable for use in implementing some embodiments of the present disclosure.

FIG. 12 is a block diagram of an example computing device(s) 1200 suitable for use in implementing, for example, in a traffic simulation operating environment in accordance with some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. For example, one or more aspects of the driving environment simulator 120, model-controlled agents 110, search algorithm 128, computation of simulation metrics 130, may be executed as code on CPU(s) 1206. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. For example, in some embodiments, model-controlled agents 110 may be executed at least in part on GPU(s) 1208. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
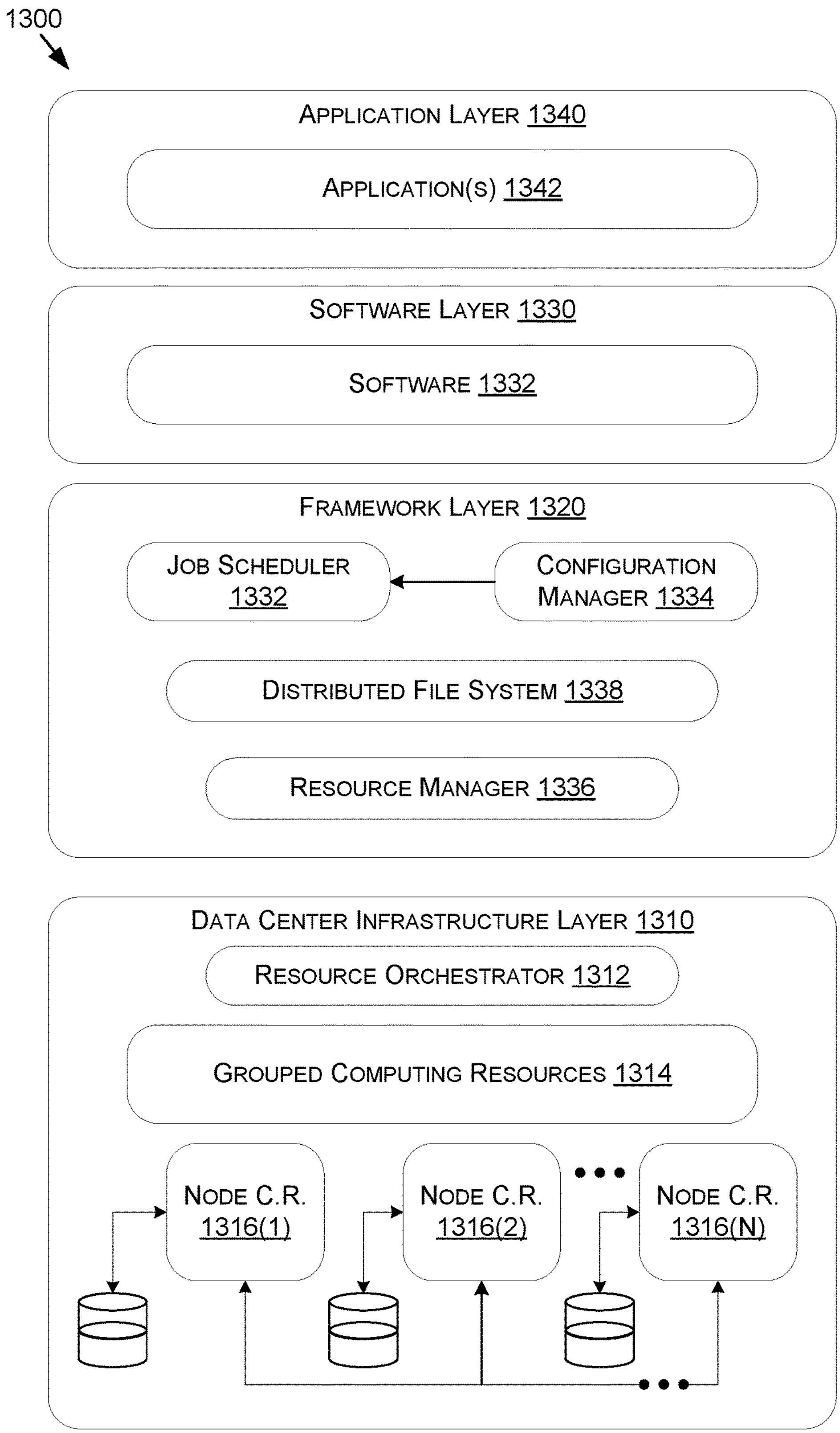
FIG. 13 is a block diagram of an example data center suitable for use in implementing some embodiments of the present disclosure.

FIG. 13 illustrates an example data center 1300 that may be used, for example, in a traffic simulation operating environment in accordance with some embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM). In some embodiments, one or more aspects of the driving environment simulator 120, model-controlled agents 110, search algorithm 128, computation of simulation metrics 130, may be executed as code at least in part on C.R.s 1316(1)-1316(N).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1332, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1332 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1332. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising:

one or more circuits to:

generate a simulation environment for testing at least one of hardware or software of a system under test, the simulation environment corresponding to a scene including at least one path for vehicle traffic, a representation of the system under test, and a plurality of agents that each represent a vehicle, actor, or object distinct from the representation of the system under test;

execute one or more time-steps of a simulation;

for at least one agent of the plurality of agents:

generate navigation probability distributions for the at least one agent, individual navigation probability distributions of the navigation probability distributions defining a candidate trajectory for the at least one agent to follow with respect to the at least one path that is predicted to avoid collisions between the at least one agent and one or more other agents of the plurality of agents;

select a trajectory for the at least one agent corresponding to a selected navigation probability distribution of the navigation probability distributions for the at least one agent; and control movement of the at least one agent within the simulation environment during execution of the one or more time-steps of the simulation based at least on the selected trajectory for the at least one agent;

generate sensor data corresponding to one or more sensors of the system under test based at least on the movement of the at least one agent within the simulation environment;

output the sensor data to the system under test;

receive one or more signals from the system under test; and update a state of the representation of the system under test within the simulation environment based at least on the one or more signals received from the system under test, wherein the one or more signals are generated by the system under test based at least on the sensor data.

2. The one or more processors of claim 1, wherein the one or more circuits are further to compute the navigation probability distributions for the at least one agent based at least on a rasterized image of the scene.

3. The one or more processors of claim 1, wherein the one or more circuits are further to compute the navigation probability distributions based at least on one or more of:

a rasterized map of the at least one path, the rasterized map being generated with respect to a coordinate frame referenced to a position of the at least one agent; or a rasterized representation of a location of one or more other agents of the plurality of agents, the rasterized representation being generated with respect to the coordinate frame referenced to the position of the at least one agent.

4. The one or more processors of claim 1, wherein the one or more circuits are further to compute the navigation probability distributions for the at least one agent based at least on a rasterized target destination of the at least one agent, the rasterized target destination generated with respect to a coordinate frame referenced to a position of the at least one agent.

5. The one or more processors of claim 1, wherein the one or more circuits are further to compute the navigation probability distributions for the at least one agent based at least on a rasterized map that includes a two-dimensional (2D) top-down view of the scene.

6. The one or more processors of claim 1, wherein individual navigation probability distributions of the navigation probability distributions are generated based at least on a Gaussian distribution, and the one or more circuits are further to compute, for the individual navigation probability distributions, the candidate trajectory for the at least one agent using a mean vector of the Gaussian distribution.

7. The one or more processors of claim 1, wherein the selected navigation probability distribution for the at least one agent is randomly selected from the navigation probability distributions for the at least one agent.

8. The one or more processors of claim 1, wherein the one or more circuits are further to execute a motion prediction model to compute the navigation probability distributions for the at least one agent based at least on a rasterized image of the scene.

9. The one or more processors of claim 8, wherein the motion prediction model includes at least one of a machine learning model or a rules-based policy model.

10. The one or more processors of claim 8, wherein the motion prediction model comprises a machine learning model trained to compute outputs corresponding to human driving decisions as represented using a training dataset derived using recorded video of live traffic scenarios.

11. The one or more processors of claim 1, wherein the one or more time-steps of the simulation comprise a plurality of time-steps, individual time-steps of the plurality of time-steps including a re-planning operation, further wherein the one or more circuits are further to compute, during the re-planning operation, the navigation probability distributions for the at least one agent and to determine the trajectory.

12. The one or more processors of claim 1, the one or more circuits are further to:

search across a plurality of time-steps to determine a number of collisions impacting the plurality of agents; and compute at least a collision statistic based at least on the search.

13. The one or more processors of claim 1, wherein the one or more circuits are further to search across a plurality of time-steps for at least one sequence of candidate trajectories that does not involve a collision between the plurality of agents over a duration of the simulation.

14. The one or more processors of claim 1, wherein the one or more circuits are further to:

execute a plurality of simulations in parallel; and search across a plurality of time-steps for individual simulations of the plurality of simulations to determine a number of collisions between the plurality of agents.

15. The one or more processors of claim 1, wherein the one or more circuits are further to cause display of at least one of:

one or more simulation metrics based at least on a number of collisions between the plurality of agents; or a graphical rendering that illustrates a motion of the plurality of agents within the scene.

16. The one or more processors of claim 1, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system for performing real-time streaming;

a system for presenting one or more of augmented reality content, virtual reality content, or mixed reality content;

a system implemented using an edge device;

a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

17. A system comprising:
one or more circuits to execute operations comprising:
controlling, at individual iterations of a plurality of iterations during execution of a simulation for testing at least one of hardware or software of a system under test, motion of an agent representing a vehicle, actor, or object distinct from a representation of the system under test in a simulation environment for the simulation, at least, by:
computing a plurality of navigation probability distributions for the agent, individual navigation probability distributions of the plurality of navigation probability distributions defining a candidate trajectory for the agent that is predicted to avoid collisions between the agent and one or more other agents distinct from the representation of the system under test;
selecting a respective candidate trajectory for the agent based at least on the plurality of navigation probability distributions for the agent; and
controlling an operation of the agent within the simulation environment based at least on the selected respective candidate trajectory for the agent;
generating sensor data corresponding to one or more sensors of the system under test based at least on the operation of the agent in the simulation environment for the simulation;
outputting the sensor data to the system under test;
receiving one or more signals from the system under test; and
updating a state of a representation of the system under test within the simulation environment based at least on the one or more signals received from the system under test, wherein the one or more signals are generated by the system under test based at least on the sensor data.

18. The system of claim 17, wherein the computing the plurality of navigation probability distributions for the agent is based at least on one or more of:
a rasterized image of a current scene in the simulation environment;
a rasterized map of a path in the simulation environment, the rasterized map generated with respect to a coordinate frame referenced to a position of the agent;
a rasterized representation of a location of the one or more other agents, the rasterized representation generated with respect to the coordinate frame referenced to the position of the agent; or
a representation of a location of the one or more other agents, the representation representing locations of bounding shape points for individual agents of the one or more other agents.

19. The system of claim 17, wherein the respective candidate trajectory for the agent is selected based at least on a random selection of a navigation probability distribution of the plurality of navigation probability distributions.

20. The system of claim 17, the operations further comprise executing a motion prediction model to compute the plurality of navigation probability distributions for the agent.

21. The system of claim 17, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing real-time streaming;
a system for presenting one or more of augmented reality content, virtual reality content, or mixed reality content;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

22. A method comprising:
controlling, during execution of one or more time-steps of a simulation for testing at least one of hardware or software of a system under test, movement of an agent representing a vehicle, actor, or object distinct from a representation of the system under test within the simulation based at least on a selected trajectory corresponding to a selected navigation probability distribution of a plurality of navigation probability distributions for the agent that are predicted to avoid collisions between the agent and one or more other agents distinct from the representation of the system under test, the selected navigation probability distribution for the agent generated based at least on a machine learning model processing a rasterized representation of a scene of the simulation;
generating sensor data corresponding to one or more sensors of the system under test that is generated based at least on the agent within the simulation;
outputting the sensor data to the system under test;
receiving one or more signals from the system under test; and
updating a state of a representation of the system under test within the simulation based at least on the one or more signals received from the system under test, wherein the one or more signals are generated by the system under test based at least on the sensor data.

* * * * *